United States Patent
Rimoto et al.

(10) Patent No.: US 6,340,332 B1
(45) Date of Patent: Jan. 22, 2002

(54) COMPUTER READABLE PROGRAM PRODUCT STORING PROGRAM FOR BALL-PLAYING TYPE GAME, SAID PROGRAM, AND BALL-PLAYING TYPE GAME APPARATUS AND METHOD

(75) Inventors: Shiyu Rimoto, Tokyo; Tomoaki Yoshinobu, Hyogo, both of (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/628,286

(22) Filed: Jul. 28, 2000

(30) Foreign Application Priority Data

May 19, 2000 (JP) .......................................... 12-148312

(51) Int. Cl.$^7$ ................................................. A63F 9/24
(52) U.S. Cl. ................................. 463/31; 463/3; 463/33
(58) Field of Search ............................ 463/1–8, 30–33, 463/36, 49–56; 434/16, 12, 37, 43, 61–62, 69, 307 R, 308–309; 273/317, 317.1, 317.16, 459, 460, 461; 345/418, 428, 433, 441, 439, 473, 474, 112, 121, 127

(56) References Cited

U.S. PATENT DOCUMENTS

| | | | | |
|---|---|---|---|---|
| 4,672,541 A | * | 6/1987 | Bromley et al. | 364/410 |
| 5,026,058 A | * | 6/1991 | Bromley | 273/93 |
| 5,435,554 A | * | 7/1995 | Lipson | 273/88 |
| 5,767,861 A | * | 6/1998 | Kimura | 345/473 |
| 5,863,248 A | * | 1/1999 | Mine et al. | 463/4 |
| 6,102,801 A | * | 8/2000 | Sugawara | 463/31 |
| 6,120,374 A | * | 9/2000 | Akada et al. | 463/3 |
| 6,149,520 A | * | 11/2000 | Takatsuka | 463/4 |
| 6,152,821 A | * | 11/2000 | Nakagawa et al. | 463/4 |
| 6,155,924 A | * | 12/2000 | Nakagawa et al. | 463/4 |
| 6,183,363 B1 | * | 2/2001 | Ishihara et al. | 463/31 |
| 6,196,917 B1 | * | 3/2001 | Mathias et al. | 463/2 |
| 6,203,425 B1 | * | 3/2001 | Hayashi | 463/1 |

FOREIGN PATENT DOCUMENTS

JP 7-163755 6/1995

OTHER PUBLICATIONS

English Language Abstract of JP7–163755.

* cited by examiner

Primary Examiner—Jessica J. Harrison
Assistant Examiner—Alex F. R. P. Rada, II
(74) Attorney, Agent, or Firm—Greenblum & Bernstein, P.L.C.

(57) ABSTRACT

A computer readable program product storing a program of a ball-playing type game which can smoothly express the continuous action of a player before and after a player obtains a ball when throwing the ball in any direction in accordance with operation of the user in the ball-playing game, wherein an input operation of the user is accepted from before the fielder receives the ball, a series of motions up to the fielder catching the ball and throwing it is judged in response to any input operation, and the motion is used to change the display up until the catching and throwing before the fielder catches the ball, such a program, and a ball-playing type game apparatus and method.

24 Claims, 15 Drawing Sheets

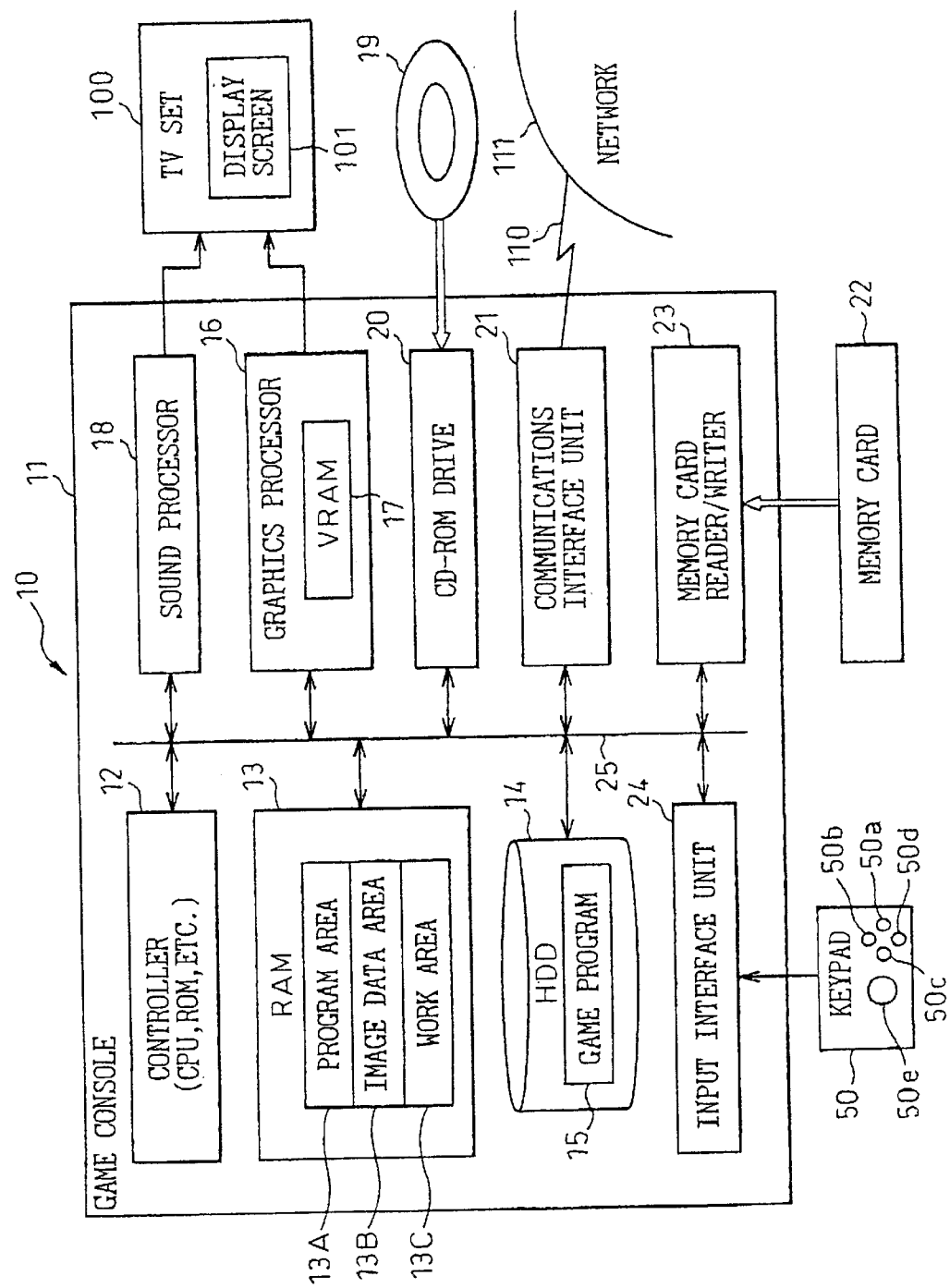

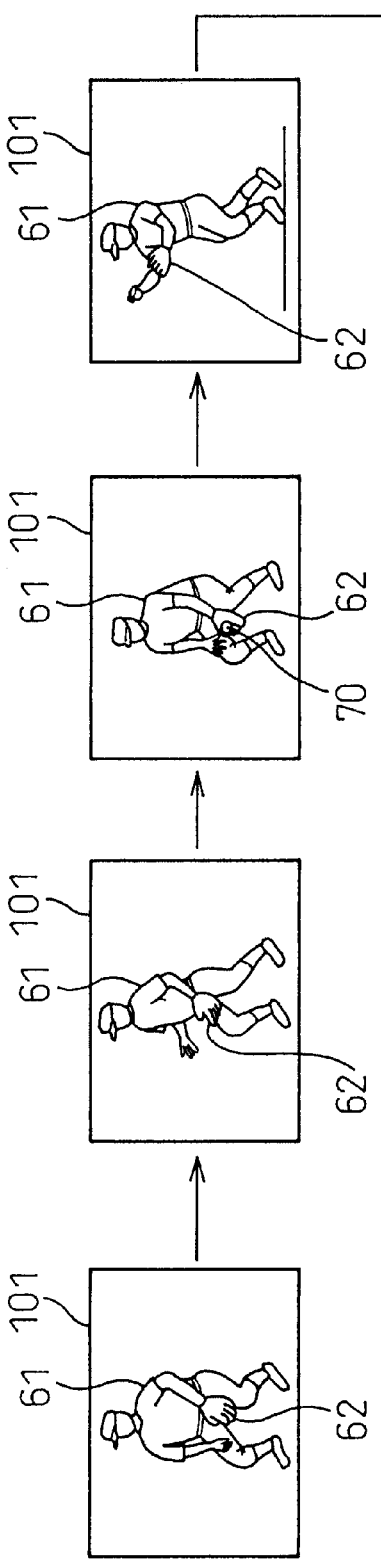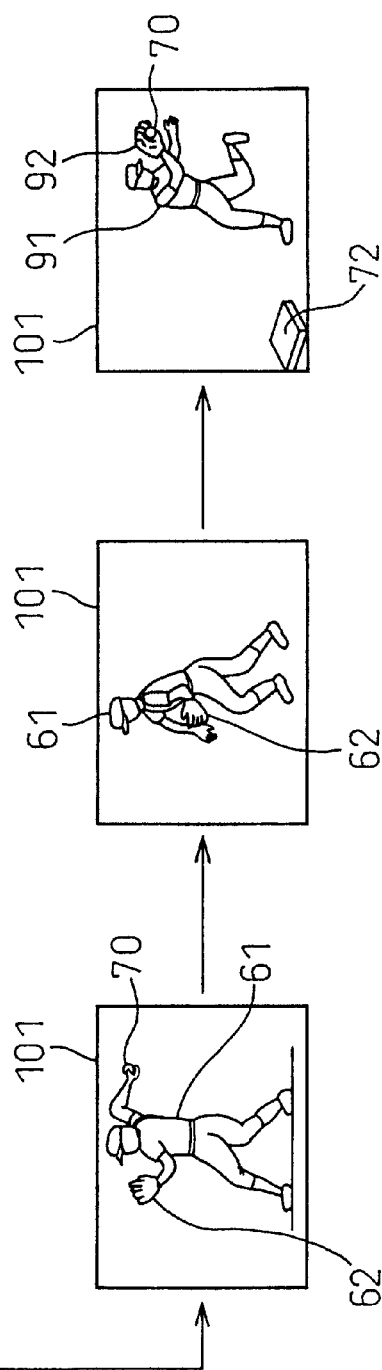

Fig.6

| DIRECTION | GROUP OF MOTIONS | NUMBER OF FRAMES | AMOUNT OF MOVEMENT PER FRAME | CATCHING RANGE | HEIGHT OF GLOVE WHEN CATCHING | RANGE OF CATCHABLE HEIGHT |
|---|---|---|---|---|---|---|
| A | #11 | 20 | 0.30 m | L1~L2 | H1 | 0~h1 |
|   | #12 | 20 | 0.30 m | L1~L2 | H2 | h1~h2 |
|   | #13 | 20 | 0.30 m | L1~L2 | H3 | h2~h3 |
|   | #14 | 20 | 0.30 m | L1~L2 | H4 | h3~h4 |
|   | #15 | 10 | 0.30 m | L1 OR LESS | H1 | 0~h1 |
|   | ... | ... | ... | ... | ... | ... |
| B | #21 | 20 | 0.20 m | L3~L4 | H1 | 0~h1 |
|   | #22 | 20 | 0.20 m | L3~L4 | H2 | h1~h2 |
|   | #23 | 20 | 0.20 m | L3~L4 | H3 | h2~h3 |
|   | #24 | 10 | 0.20 m | L3 OR LESS | H1 | 0~h1 |
|   | ... | ... | ... | ... | ... | ... |
| C | #31 | 20 | 0.15 m | L5~L6 | H1 | 0~h1 |
|   | #32 | 20 | 0.15 m | L5~L6 | H2 | h1~h2 |
|   | #33 | 20 | 0.15 m | L5~L6 | H3 | h2~h3 |
|   | #34 | 10 | 0.15 m | L5 OR LESS | H1 | 0~h1 |
|   | ... | ... | ... | ... | ... | ... |
| D | #41 | 20 | 0.20 m | L3~L4 | H1 | 0~h1 |
|   | #42 | 20 | 0.20 m | L3~L4 | H2 | h1~h2 |
|   | #43 | 20 | 0.20 m | L3~L4 | H3 | h2~h3 |
|   | #44 | 10 | 0.20 m | L3 OR LESS | H1 | 0~h1 |
|   | ... | ... | ... | ... | ... | ... |
|   | #M | 10 | 0.20 m | L3 OR LESS | H4 | h3~h4 |
| ... | ... | ... | ... | ... | ... | ... |

Fig.7

| THROWING DIRECTION | THROWABLE DISTANCE |
|---|---|
| FORWARD | D1~D2 |
| RIGHT | D1~D2 |
| LEFT | D1~D2 |
| BACK | D1~D2 |
| FORWARD | 0~D2 |
| ⋮ | ⋮ |
| FORWARD | D1~D2 |
| RIGHT | D1~D2 |
| LEFT | D1~D2 |
| BACK | D1~D2 |
| ⋮ | ⋮ |
| FORWARD | D1~D2 |
| RIGHT | D1~D2 |
| LEFT | D1~D2 |
| BACK | D1~D2 |
| ⋮ | ⋮ |
| FORWARD | D1~D2 |
| RIGHT | D1~D2 |
| LEFT | D1~D2 |
| BACK | D1~D2 |
| ⋮ | ⋮ |
| BACK | 0~D1 |
| ⋮ | ⋮ |

COMPUTER READABLE PROGRAM PRODUCT STORING PROGRAM FOR BALL-PLAYING TYPE GAME, SAID PROGRAM, AND BALL-PLAYING TYPE GAME APPARATUS AND METHOD

The present disclosure relates to subject matter contained in Japanese Patent Application No. 2000-148312, filed on May 19, 2000, the disclosure of which is expressly incorporated herein by reference in its entirety.

BACKGROUND OF THE INVENTION

1. Field of the Invention

The present invention relates to a computer readable program product storing a program of a ball-playing type game controlling a player or ball in the ball-playing type game, such a program, and a ball-playing type game processor and method.

2. Description of the Related Art

At the present time, in sports types games, not only one-against-one contest games, but also group-against-group contest games have been realized such as tennis, soccer, basketball, American football, and baseball.

To play such sports type games, it is necessary to operate control units (control panels, keypads, etc.) provided in advance in an arcade machine or specialized game machine (PlayStation (made by Sony Computer Entertainment), Dreamcast (made by Sega Enterprise), etc.)

The control unit is in general comprised of a plurality of keys (or buttons) or a joystick. Whether a sports type game or a role-playing game, a control system comprised of a limited number of buttons and number of joysticks on a control unit is incorporated. Of course, a game can be played on even a personal computer. If using a keyboard, keys necessary for control of the game are assigned from the keyboard.

In baseball, soccer, basketball, and other ball-playing type games in sports type games, generally the movement of the ball itself cannot be controlled by the buttons or joystick. Instead, the user can control the motion of the player holding the ball or the movement of the player with respect to an incoming ball so as to indirectly control the direction or force of next movement of the ball.

In a baseball game, when a hit ball flies toward the shortstop with no runners on base, if in a range of action where the shortstop can catch the ball, the shortstop can be made to catch the ball. If the user inputs an instruction for throwing the ball to first base at the time of catching, the ball is thrown by the shortstop toward first base. If the first baseman already is covering first base, the thrown ball is caught by the first baseman. In this way, it is possible to instruct where to next throw the ball by operational input by the user (button operation) in the state with the ball caught by the shortstop.

As this type of technology, there is for example Japanese Patent No. 2502473. This publication discloses the technology of judging if a fielder has caught the ball, then judging the base where the ball should be thrown next for a button operation by the user and making the ball move to the judged base.

Summarizing the problem to be solved by the invention, if trying to express in detail the action of a fielder catching a hit ball or a ball thrown from another fielder and further throwing it as a series of actions, it becomes necessary to express the continuous action from starting the pose for catching the ball. When catching the ball, then judging where to throw it and shifting the action from catching to a pose for throwing, the movements of the fielder before catching and after catching become independent such as in the above Japanese Patent No. 2502473. As a result, there is no smooth connection in the movements before and after catching and it becomes difficult to express the continuous movement from catching to throwing.

Recent advances made in computer graphics have made it possible to smoothly express movement of a fielder in three-dimensional virtual space. As this type of related art, there is for example International Publication No. WO98/43715. This publication discloses the art of realizing a catching action by combining several types of motions.

As described in the above International Publication No. WO98/43715, it is possible to smoothly express the action of a fielder due to advances in image processing. If determining the throwing action after the catching action is completed as in the related art, however, it is difficult to obtain smooth continuity of action between the state before and after catching.

Therefore, with just smoothly expressing the action of the fielder, the smoother the action, the more the discontinuously expressed portions stand out in continuous actions. Accordingly, the balance in expression becomes poor and conversely a strange feeling is given to the user.

A baseball game was explained in detail above, but the requirement for smooth continuity in the action of a player with respect to the ball applies to all ball-playing games handling balls due to the relationship between the instructions for action of the player by the user and the continuous actions of the player displayed. As examples of ball-playing games, there are soccer, basketball, tennis, American football, and ice hockey.

SUMMARY OF THE INVENTION

An object of the present invention is to provide a computer readable program product storing a program of a ball-playing type game which can smoothly express the continuous action of a player before and after a player obtains a ball when throwing the ball in any direction in accordance with operation of the user in the ball-playing game, such a program, and a ball-playing type game apparatus and method.

According to a first aspect of the present invention, there is provided a computer readable program product storing a program for a ball-playing type game which realizes a ball-playing game indirectly controlling movement of a ball in accordance with movement of a player, the program product storing a program for making a computer judge positions of movement of a first player and a ball on a time axis, judge a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and display movement of the first player using the judged group of motions.

In the first aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with displaying the movement of the first player.

According to a second aspect of the invention, there is provided a computer readable program product storing a program for a ball-playing type game which realizes a ball-playing game indirectly controlling movement of a ball in accordance with movement of a player, the program product storing a program for making a computer judge positions of movement of a first player and a ball on a time axis, judge an instruction for movement of the ball from the first player to the second player in response to an operation by a user, judge a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and display movement of the first player using the judged group of motions.

In the second aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with the movement of the first player.

According to a third aspect of the present invention, there is provided a computer readable program product storing a program for a ball-playing type game which realizes a ball-playing game indirectly controlling movement of a ball in accordance with movement of a player, the program product storing a program for making a computer judge positions of movement of a first player and a ball on a time axis, predict a future positional relationship between the first player and the ball by the judgement on the time axis, calculate a time required until the first player reaches the ball only when it is judged that the first player can reach the ball from the predicted positional relationship, a plurality of groups of motions for making the ball move between players being assigned to each player and display times being assigned to each group of motions, judge a group of motions having a display time shorter than the calculated required time and making the ball move from the first player to a second player by said judged group of motions from the pluraliy of groups of motions assigned to the first player, and display movement of the first player using the judged group of motions.

In the third aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to a fourth aspect of the present invention, there is provided a computer readable program product storing a program for a ball-playing type game which realizes a ball-playing game indirectly controlling movement of a ball in accordance with movement of a player, the program product storing a program for making a computer judge positions of movement of a first player and a ball on a time axis, judge an instruction of movement of the ball from the first player to the second player in response to an operation of the user, predict a future positional relationship between the first player and the ball by the judgement on the time axis, calculate a time required until the first player reaches the ball only when it is judged that the first player can reach the ball from the predicted positional relationship, a plurality of groups of motions for making the ball move between players being assigned to each player and display times being assigned to each group of motions, judge a group of motions having a display time shorter than the calculated required time and making the ball move from the first player to a second player by said judged group of motions from the pluraliy of groups of motions assigned to the first player, and display movement of the first player using the judged group of motions.

In the fourth aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to a fifth aspect of the present invention, there is provided a program for a ball-playing type game which realizes a ball-playing game indirectly controlling movement of a ball in accordance with movement of a player using a computer, comprising making a computer judge positions of movement of a first player and a ball on a time axis, judge a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and display movement of the first player using the judged group of motions.

In the fifth aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with displaying the movement of the first player.

According to a sixth aspect of the present invention, there is provided a program for a ball-playing type game which realizes a ball-playing game indirectly controlling movement of a ball in accordance with movement of a player using a computer, comprising making a computer judge positions of movement of a first player and a ball on a time axis, judge an instruction for movement of the ball from the first player to the second player in response to an operation by a user, judge a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and display movement of the first player using the judged group of motions.

In the sixth aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with displaying the movement of the first player.

According to a seventh aspect of the present invention, there is provided a program for a ball-playing type game which realizes a ball-playing game indirectly controlling movement of a ball in accordance with movement of a player using a computer, comprising making a computer judge positions of movement of a first player and a ball on a time axis, predict a future positional relationship between the first player and the ball by the judgement on the time axis, calculate a time required until the first player reaches the ball only when it is judged that the first player can reach the ball from the predicted positional relationship, a plurality of groups of motions for making the ball move between players being assigned to each player and display times being assigned to each group of motions, judge a group of motions having a display time shorter than the calculated required time and making the ball move from the first player to a second player by said judged group of motions from the pluraliy of groups of motions assigned to the first player, and display movement of the first player using the judged group of motions.

In the seventh aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to an eighth aspect of the present invention, there is provided a program for a ball-playing type game which realizes a ball-playing game indirectly controlling movement of a ball in accordance with movement of a player using a computer comprising making a computer judge positions of movement of a first player and a ball on a time axis, judge an instruction of movement of the ball from the first player to the second player in response to an operation of the user, predict a future positional relationship between the first player and the ball by the judgement on the time axis, calculate a time required until the first player reaches the ball only when it is judged that the first player can reach the ball from the predicted positional relationship, a plurality of groups of motions for making the ball move between players being assigned to each player and display times being assigned to each group of motions, judge a group of motions having a display time shorter than the calculated required time and making the ball move from the first player to a second player by said judged group of motions from the pluraliy of groups of motions assigned to the first player, and display movement of the first player using the judged group of motions.

In the eighth aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to a ninth aspect of the present invention, there is provided a ball-playing type processor comprising a computer readable program product storing a program for realizing a ball-playing game indirectly controlling movement of a ball in accordance with movement of a player, a computer for reading and executing at least part of a program from the program product, and a display for displaying a ball-playing type game realized by the program, the computer reading at least part of a program from the program product and thereby judging positions of movement of a first player and a ball on a time axis, judging a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and displaying movement of the first player using the judged group of motions.

In the ninth aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with displaying the movement of the first player.

According to a 10th aspect of the present invention, there is provided a ball-playing type processor comprising a computer readable program product storing a program for realizing a ball-playing game indirectly controlling movement of a ball in accordance with movement of a player, a computer for reading and executing at least part of a program from the program product, and a display for displaying a ball-playing type game realized by the program, the computer reading at least part of a program from the program product and thereby judging positions of movement of a first player and a ball on a time axis, judging an instruction for movement of the ball from the first player to the second player in response to an operation by a user, judging a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and displaying movement of the first player using the judged group of motions.

In the 10th aspect of the invention, the program may further make the computer judge the group of motions for making the ball move from the first player to the second player from the plurality of groups of motions assigned to the second player in accordance with a future positional relationship between the first player and the ball judged on the time axis and display movement of the second player using the group of motions judged for the second player along with displaying the movement of the first player.

According to an 11th aspect of the present invention, there is provided a ball-playing type processor comprising a computer readable program product storing a program for realizing a ball-playing game indirectly controlling movement of a ball in accordance with movement of a player, a computer for reading and executing at least part of a program from the program product, and a display for displaying a ball-playing type game realized by the program, the computer reading at least part of a program from the program product and thereby judging positions of movement of a first player and a ball on a time axis, predicting a future positional relationship between the first player and the ball by the judgement on the time axis, calculating a time required until the first player reaches the ball only when it is judged that the first player can reach the ball from the predicted positional relationship, a plurality of groups of motions for making the ball move between players being assigned to each player and display times being assigned to each group of motions, judging a group of motions having a display time shorter than the calculated required time and making the ball move from the first player to a second player by said judged group of motions from the pluraliy of groups of motions assigned to the first player, and displaying movement of the first player using the judged group of motions.

In the 11th aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to a 12th aspect of the present invention, there is provided a ball-playing type processor comprising a computer readable program product storing a program for realizing a ball-playing game indirectly controlling movement of a ball in accordance with movement of a player, a computer for reading and executing at least part of a program from the program product, and a display for displaying a ball-playing type game realized by the program, the computer reading at least part of a program from the program product and thereby judging positions of movement of a first player and a ball on a time axis, judging an instruction of movement of the ball from the first player to the second player in response to an operation of the user, predicting a future positional relationship between the first player and the ball by the judgement on the time axis, calculating a time required until the first player reaches the ball only when it is judged that the first player can reach the ball from the predicted positional relationship, a plurality of groups of motions for making the ball move between players being assigned to each player and display times being assigned to each group of motions, judging a group of motions having a display time shorter than the calculated required time and making the ball move from the first player to a second player by said judged group of motions from the pluraliy of groups of motions assigned to the first player, and displaying movement of the first player using the judged group of motions.

In the 12th aspect of the invention, the program may further make the computer judge the group of motions for making the ball move from the first player to the second player from the plurality of groups of motions assigned to the second player in accordance with the group of motions judged for the first player and display movement of the second player using the group of motions judged for the second player along with displaying the movement of the first player.

According to a 13th aspect of the present invention, there is provided a ball-playing type processing method for realizing a ball-playing game indirectly controlling movement of a ball in accordance with movement of a player, comprising judging positions of movement of a first player and a ball on a time axis, judging a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and displaying movement of the first player using the judged group of motions.

In the 13th aspect of the invention, the method may further comprise judging the group of motions for making the ball move from the first player to the second player from the plurality of groups of motions assigned to the second player in accordance with a future positional relationship between the first player and the ball judged on the time axis and displaying movement of the second player using the group of motions judged for the second player along with displaying the movement of the first player.

According to a 14th aspect of the present invention, there is provided a ball-playing type processing method for realizing a ball-playing game indirectly controlling movement of a ball in accordance with movement of a player, comprising judging positions of movement of a first player and a ball on a time axis, judging an instruction for movement of the ball from the first player to the second player in response to an operation by a user, judging a group of motions for making the ball move from the first player to a second player from a plurality of groups of motions assigned to the first player in accordance with a future positional relationship between the first player and the ball judged on the time axis, a plurality of groups of motions for making the ball move between players being assigned to each player, and displaying movement of the first player using the judged group of motions.

In the 14th aspect of the invention, the method may further comprise judging the group of motions for making the ball move from the first player to the second player from the plurality of groups of motions assigned to the second player in accordance with a future positional relationship between the first player and the ball judged on the time axis and displaying movement of the second player using the group of motions judged for the second player along with displaying the movement of the first player.

According to a 15th aspect of the present invention, there is provided a ball-playing type processing method for realizing a ball-playing game indirectly controlling movement of a ball in accordance with movement of a player, comprising judging positions of movement of a first player and a ball on a time axis, predicting a future positional relationship between the first player and the ball by the judgement on the time axis, calculating a time required until the first player reaches the ball only when it is judged that the first player can reach the ball from the predicted positional relationship, a plurality of groups of motions for making the ball move between players being assigned to each player and display times being assigned to each group of motions, judging a group of motions having a display time shorter than the calculated required time and making the ball move from the first player to a second player by said judged group of motions from the pluraliy of groups of motions assigned to the first player, and displaying movement of the first player using the judged group of motions.

In the 15th aspect of the invention, the method may further comprise judging the group of motions for making the ball move from the first player to the second player from the plurality of groups of motions assigned to the second player in accordance with the group of motions judged for the first player and displaying movement of the second player using the group of motions judged for the second player along with displaying the movement of the first player.

According to a 16th aspect of the present invention, there is provided a ball-playing type processing method for realizing a ball-playing game indirectly controlling movement of a ball in accordance with movement of a player, comprising judging positions of movement of a first player and a ball on a time axis, judging an instruction of movement of the ball from the first player to the second player in response to an operation of the user, predicting a future positional relationship between the first player and the ball by the judgement on the time axis, calculating a time required until the first player reaches the ball only when it is judged that the first player can reach the ball from the predicted positional relationship, a plurality of groups of motions for making the ball move between players being assigned to each player and display times being assigned to each group of motions, judging a group of motions having a display time shorter than the calculated required time and making the ball move from the first player to a second player by said judged group of motions from the pluraliy of groups of motions assigned to the first player, and displaying movement of the first player using the judged group of motions.

In the 16th aspect of the invention, the method may further comprise judging the group of motions for making the ball move from the first player to the second player from the plurality of groups of motions assigned to the second player in accordance with the group of motions judged for the first player and displaying movement of the second player using the group of motions judged for the second player along with displaying the movement of the first player.

BRIEF DESCRIPTION OF THE DRAWINGS

These and other objects and features of the present invention will become clearer from the following description of the preferred embodiments given with reference to the attached drawings, in which:

FIG. 1 is a block diagram of an example of the hardware configuration of an embodiment of the present invention;

FIG. 4A, FIG. 4B, FIG. 4C, FIG. 4D, FIG. 4E, FIG. 4F, and FIG. 4G are views explaining another example of motions from catching to throwing according to an embodiment of the present invention;

FIG. 6 is a view schematically explaining an example of motion control according to an embodiment of the present invention;

FIG. 7 is a view schematically explaining an example of motion control according to an embodiment of the present invention;

DESCRIPTION OF THE PREFERRED EMBODIMENTS

Figure 2A:
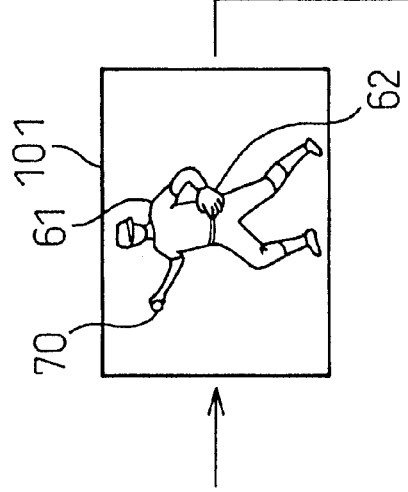
FIG. 2A, FIG. 2B, FIG. 2C, FIG. 2D, FIG. 2E, FIG. 2F, and FIG. 2G are views explaining an example of motions in catching according to an embodiment of the present invention.

Preferred embodiments of the present invention will be explained below with reference to the drawings. In the following explanation, a baseball game is used as an example among the various ball-playing type games.

First, an explanation will be made of the configuration using FIG. 1. FIG. 1 shows an example of the configuration of a video game system according to an embodiment of the present invention. The video game system 10 shown in FIG. 1 is provided with the functions of a ball-playing type game processor according to an embodiment of the present invention. Further, the video game system 10 executes a program stored on a computer readable program product according to an embodiment of the present invention. Further, the video game system 10 is used for working the ball-playing type game processing method according to an embodiment of the present invention.

The video game system 10 is for example comprised of a game console 11 for processing a video game in accordance with a program, a keypad 50 for interactively controlling the video game, and a television set (hereinafter called a "TV set") having a cathode ray tube (CRT) etc. as a monitor with speakers. Further, this video game system 10 is provided with a communications interface unit 21 and is connected to a network 111 by a communications line 110 for data communications with another network apparatus.

The keypad 50 has a group of buttons (buttons 50a, 50b, 50c, 50d, etc.) or a joystick 50e able to be operated by the user (operator). Instructions due to the button operation or joystick operation of the user are given to the game console 11. Here, the buttons or joystick have the functions of inputting a pitching operation of the pitcher, a swinging operation of the batter, a stealing operation of a runner, and a catching/throwing operation of a fielder in the operation of a baseball game explained later.

The TV set 100 displays a video (image) or outputs sound in accordance with the content of the game based on a video signal and sound signal output from the game console 11.

The game console 11 has an internal bus 25. The internal bus 25 has connected to it a controller provided with a central processing unit (CPU), read only memory (ROM), and other units, a random access memory (RAM) 13, and a hard disk drive (HDD) 14.

The controller 12 controls the hardware as a whole and stores all or part of the program in the RAM 13 for execution of the game processing.

The RAM 13 is provided with a program area 13A, an image data area 13B, a work area 13C, etc. The program area 13A stores the program of the game. The program area 13A stores all or part of the game program read by the CD-ROM drive 20 from the CD-ROM 19. The image data area 13B stores image data such as the background or game characters required in the process of execution of the program. The work area 1 3C stores various types of data generated in the process of execution of the program.

Note that the game program and image data can be supplied from an HDD 14 other than a CD-ROM 19. In this case, the game program or image data may be stored in a hard disk 15 of the HDD 14. The hard disk 15 may store the game program or image data installed in advance or downloaded through the communications line 110 from the network 111.

Further, the internal bus 25 has connected to it an input interface unit 24, a sound processor 18, and a graphic processor 16. The keypad 50 is connected through the input interface unit 24 to the internal bus 25. Further, the TV set 100 connects the sound processor 18 and graphic processor 16 through it to the internal bus 25.

The graphic processor 16 is provided with a video random access memory (VRAM) 17 having a frame buffer. The graphic processor 16 generates a video signal based on the image data stored in the frame buffer by instructions from the controller 12 along with execution of the program and outputs the video signal to the TV set 100. Due to this, an image is displayed on the display screen 101 of the TV set 100 by the image data stored in the frame buffer.

The sound processor 18 generates a sound signal expressing voices, background music (BGM), sound effects, etc. in accordance with the instruction from the controller 12 and outputs the sound signal to the TV set 100.

The internal bus 25 further has connected to it a CD-ROM drive 20 and a memory card reader-writer 23. The CD-ROM drive 20 reads the game program, image data, sound data, etc. stored in the program product, that is, the CD-ROM 19. The memory card reader-writer 23 writes data to and reads data from the memory card 22 in accordance with the control of the controller 12. The data written in the memory card 22 includes data showing the intermediate elapse of the game, data indicating the environmental settings of the game, etc.

Next, an explanation will be given of the relationship between the change of state of the player and the user operation according to an embodiment of the invention. FIG. 2A, FIG. 2B, FIG. 2C, FIG. 2D, FIG. 2E, FIG. 2F, and FIG. 2G are views explaining an example of motions in catching according to an embodiment of the present invention; and FIG. 3A, FIG. 3B, FIG. 3C, FIG. 3D, FIG. 3E, FIG. 3F, and FIG. 3G are views explaining an example of motions from catching to throwing according to an embodiment of the present invention. FIG. 4A, FIG. 4B, FIG. 4C, FIG. 4D, FIG. 4E, FIG. 4F, and FIG. 4G are views explaining another example of motions from catching to throwing according to an embodiment of the present invention, and FIG. 5A, FIG. 5B, FIG. 5C, and FIG. 5D are views explaining another example of motions in throwing between players according to an embodiment of the present invention.

First, an explanation will be given of an example of the operation up to catching. In FIGS. 2A to 2G, reference numeral 101 is a display screen, 61 is a fielder, 62 is a glove, and 70 is a ball.

As shown in FIG. 2A, the fielder 61 adopts a waiting pose for catching in the state with the glove 62 on the hand. When the fielder 61 is a player controllable by the user, operational input of the user for the fielder 61 is already accepted from the time when the ball 70 is hit back by the batter or the ball 70 is thrown from another fielder. The user can operate the keypad 50 to instruct the desired throw destination from the time when the ball 70 is hit back by the batter or the ball 70 is thrown from another fielder.

Here, the throw destination indicates a fielder, specifically the fielder covering first base, the fielder covering second base, the fielder covering third base, or the fielder covering home base. Note that when the hit ball flies to the outfield, for example, when controlling the fielder covering home base, it is possible to express the play more realistically if having a relay catch the ball midway.

When the fielder 61 is determined as the catcher, whether or not there is an operational input designating the throw destination at that time, at least the motions until catching are determined substantially simultaneously with the decision of the catcher. The action of the fielder 61 up to catching is started by these determined motions.

The catcher is determined by processing by the computer. In the processing by the computer, the fielder who can reach the ball fastest is calculated from the one or more fielders close to the path of the ball 70 in accordance with operation of the fielders by the user (button operation, joystick operation, etc.)

Here, a brief explanation will be given of the methods of determination of motions for the case where there is an operational input of the user and there is not. First, an explanation will be made of the case where there is an operational input of the user. As one example, an explanation will be given of the group of motions for controlling the operation of the fielder 61 from FIG. 2B on.

If the throw destination is designated by a button operation by the user before the fielder 61 catches the ball 70 (for example, the scene of FIG. 2A), the optimal motions until just before throwing after catching the ball are determined for the designated throw destination for the motions after the button operation. That is, the throw destination is provisionally determined from before the fielder 61 catches the ball 70 (for example, the time of FIG. 2A), then the action of the fielder 61 is started by the optimal group of motions for the throw destination.

Here the "determined group of motions" indicates the series of motions until just before the fielder 61 catches and throws the ball 70. That is, the "group of motions" indicates the series of motions until just before throwing the ball 70 to the fielder covering the base designated by the operational input of the user (throw designation).

Figures 2B, 2C, 2D:
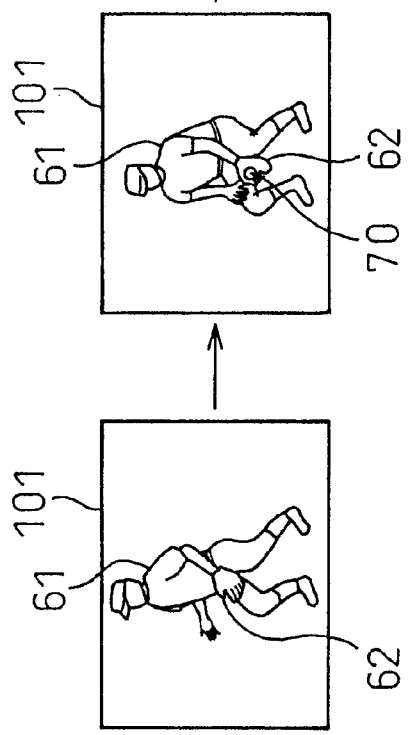

Therefore, when the throw destination is input in advance before the stage of FIG. 2A, the action of the fielder 61 is controlled for display by the series of motions for throwing the ball 70 to the throw destination designated by the user from FIG. 2B on. Here, the executed motion processing becomes the change in motions until just before the ball is thrown after the fielder catches the ball when the throw destination is designated before the stage of control of the movement of the fielder by the group of motions processed by the computer (see FIGS. 2A to 2G).

Further, when there is no operational input from the user at the stage of FIG. 2A, it is possible to determine the optimal throw destination in accordance with the state of progress of the game, that is, in accordance with the presence of runners at the present time, the deployment of the fielders, etc. The optimal group of motions matching the throw destination is determined. The group of motions determined here indicates the motions suitable for the fielder to catch the ball and then throw the ball to the optimal throw destination (fielder covering most suitable base).

In this way, even if there is no operational input even after the scene of FIG. 2A passes, the action of the fielder 61 can be controlled for display by the optimal group of motions for the optimal throw destination. Here, the motion processing executed becomes the change of motions after the ball is caught to just before throwing when the throw destination is not instructed before and after the stage of controlling the movement of the fielder by the group of motions processed by the computer (see FIGS. 2A to 2G).

Note that the motion processing when there is an operational input for designating the throw destination after for example after FIG. 2B will be explained with reference to FIGS. 3A to 3G, FIGS. 4A to 4G, and FIGS. 5A to 5D.

Here, as the control of motion, it is possible to link a plurality of motions with each fielder or share motions among fielders. Giving independent motions to each fielder enables a more realistic expression to be realized. On the other hand, by sharing motions among fielders, it becomes possible to manage data simply by simplifying the expression of the motions.

Next, an explanation will be given of the motion processing for the case where there is an operation and the case where there is not referring to the common drawings (FIGS. 2B to 2D).

When the change of display by the group of motions determined in the above way is started, as shown in FIG. 2B, the fielder 61 is controlled to move toward the position which the ball will reach in the future under the control of motions of the computer (right direction in the example of FIG. 2B).

When the fielder is positioned on the path of the ball 70 and reaches the position of the ball 70, as shown in FIG. 2C, the motions of the fielder 61 catching the ball 70 are displayed. At this time, if correcting the position of the glove 62, the accuracy of the display of the motions is improved. Therefore, it is also possible to predict the position which the ball 70 will reach in the future and make the glove 62 move to that predicted position.

After catching the ball, as shown in FIG. 2D, the series of motions shifts to the motion up to immediately before the fielder 61 throws the ball. When applying advanced motion processing, if for example the fielder which is the optimal throw destination is the fielder covering second base, the motion in the middle of shifting to the action of throwing the ball 70 toward the fielder is displayed.

Figures 2E, 2F, 2G:
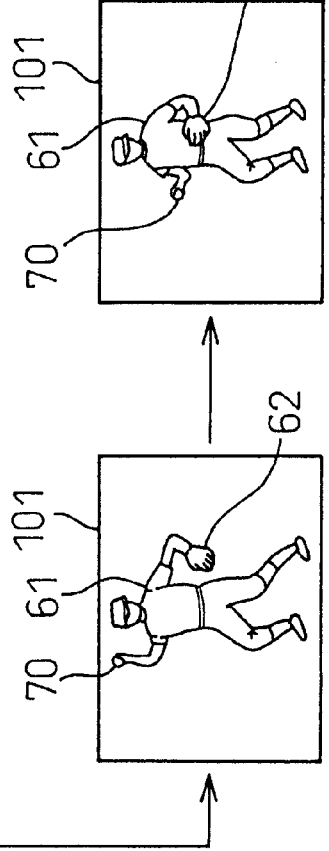

Next, as shown in FIG. 2E, the motion of the fielder 61 becomes the pose just before throwing the ball 70 to the optimal throw destination (for example, the fielder covering second base). Here, since there is no operational input around when the fielder 61 catches the ball 70, the motion shifts to FIGS. 2F and 2G.

If there is no operational input even when reaching the pose for throwing (see FIG. 2E), as shown in FIG. 2F next, the motion of the fielder 61 lowering the arm holding the ball 70 is displayed. Next, as shown in FIG. 2G, the fielder 61 enters a waiting state. In the waiting state, for example, the ball 70 is held at the chest level and the state where the ball can be immediately thrown to the throw destination after the throw destination is determined is held.

In this way, when there is no operational input of the user after this, including the scene of FIG. 2B, it is possible to express the movement of the fielder by motions naturally shifting from the state of the throwing pose to the waiting state. The movement of the ball 70 is indirectly controlled for display based on the series of motions of the fielder 61.

Next, an explanation will be given of an example of the case where the throw destination is input by the user after the start of the action of the fielder by a group of motions. FIGS. 3A, 3B, 3C, 3D, 3E, 3F, and 3G show an example of the change of state of the group of motions from a fielder catching to throwing a ball. FIGS. 3A to 3G show images displayed on the display screen. In FIGS. 3A to 3G, 81 indicates a fielder, 82 a glove, and 71 a base.

Figures 3A, 3B, 3C, 3D, 3E, 3F, 3G:
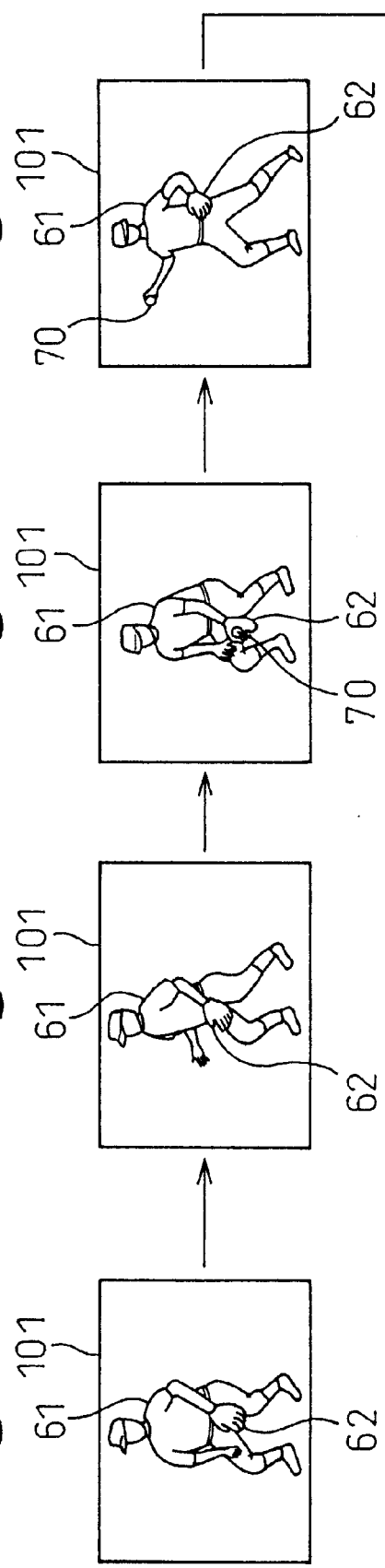
FIG. 3A, FIG. 3B, FIG. 3C, FIG. 3D, FIG. 3E, FIG. 3F, and FIG. 3G are views explaining an example of motions from catching to throwing according to an embodiment of the present invention.

As shown in FIG. 3A, the fielder 61 adopts a waiting pose for catching the ball in the state with the glove 62 on his hand. This stage is the stage where the movement of the fielder 61 by the group of motions is not yet controlled for display. When the fielder 61 is a controllable player, operational input of the user for the fielder 61 is already accepted from the time when the ball 70 is either hit back by the batter or the ball 70 is thrown from another fielder. The user can operate the keypad 50 to designate the desired throw destination.

Here, the "throw destination" indicates a fielder, more specifically, indicates the fielder covering first base, the fielder covering second base, the fielder covering third base, and the fielder covering home base. Note that when the hit ball flies to the outfield, when the user operates the fielder covering home base, it is possible to express the play more realistically if having a relay catch the ball midway.

When the fielder 61 is determined as the catcher, since the throw destination is not instructed at the stage of FIG. 3A, if the throw destination is determined to be the fielder covering second base by the judgement of the computer, the motions from catching the ball to just before throwing it are determined substantially simultaneously with the determination of the catcher. Due to this, the action from the fielder 61 catching to just before throwing the ball is started. In the same way as explained with reference to FIGS. 2A to 2G, however, at the stage of FIG. 3A corresponding to FIG. 2A, the action of the fielder by the group of motions is not controlled for display.

First, the catcher is determined by processing by the computer. In the processing by the computer, the fielder who can reach the ball the fastest is calculated from the one or more fielders close to the path of the ball 70.

In this example, the fielder 61 is determined as the catcher and the fielder for example covering second base is determined as the throw destination. The group of motions determined here are the motions suitable for action until just before the ball is thrown to the throw destination instructed by the operational input of the user, that is, the fielder covering second base.

When the display and control of the fielder by the group of motions determined in this way are started, as shown in FIG. 3B, the fielder 61 is controlled to move toward the position which the ball 70 will reach in the future (in the example of FIG. 3B, the right direction) under the motion control of the computer. Here, the explanation will be made assuming there was an operational input of the user at the stage of FIG. 3B (before catching the ball 70).

When the fielder 61 is positioned on the path of the ball 70 and reaches the position of the ball 70, as shown in FIG. 3C, the motion of the fielder 61 catching the ball 70 is displayed. At this time, if correcting the position of the glove 62 by image processing, the accuracy of the display of the motion is improved. Therefore, it is also possible to predict the position which the ball 70 will reach in the future and make the glove 62 move to that predicted position.

After catching the ball, as shown in FIG. 3D, the series of motions shifts to the motions of the fielder 61. In this example, the motions in the middle shifting to the action of the fielder 61 throwing the ball 70 toward the fielder covering second base are displayed.

Next, as shown in FIG. 3E, the motion of the fielder 61 becomes the pose just before throwing the ball 70 to the fielder covering second base. In the example of FIGS. 2A to 2B, since there is no operational input by the user during the action of the fielder due to the group of motions, the display shifts to the neutral state of the fielder 61 after FIG. 2E corresponding to FIG. 3E.

Here, before the fielder 61 catches the ball 70, for example, there is an operational input designating the fielder covering second base as the throw destination. Therefore, after FIG. 3E, as shown in FIG. 3F, the motion of the fielder 61 shifts to move for throwing the ball 70 to the fielder covering second base as the throw destination. That is, due to the operation input of the user at the stage of FIG. 3B, the group of motions until throwing is determined again.

Further, when the fielder 61 throws the ball, as shown in FIG. 3G, a scene is formed in which the fielder 81 covering second base (throw destination) catches the ball 70. In this example, control is performed so that the fielder 81 covers second base 71 in accordance with the progress of the game, so the fielder 81 becomes the throw destination.

In the scene shown in FIG. 3G, however, the state is shown where the fielder 81 catches the ball 70. By controlling the movement at the side receiving the thrown ball so that, for example, after the ball is hit back, the fielders at suitable locations cover the bases at all times in accordance with the state of progress of the game, it is possible to realize realistic play.

If there is an operational input making the fielder covering second base the throw destination after the action of the fielder 61 is started by the group of motions in this way, the fielder covering second base is judged as the throw destination. Further, the movement of the fielder 61 is controlled for display until the end of the throwing action by motions suitable for throwing to the fielder 81 covering second base. That is, before the fielder 61 catches the ball 70, it is already determined where to throw the ball 70 by the operational input of the user.

Giving a further explanation, up until the scene of FIG. 3E for example, the series of motion processing is performed by the optimal group of motions if the fielder is in a state able to catch the ball even if the user designates the throw destination by an input operation.

Therefore, it becomes possible for the user to designate the final throw destination at all times while viewing the change in the display due to the series of motions. This change of display includes the state of catching of the fielder and smoothly expresses the motions around the time of catching. Due to this, it becomes possible to input instructions for action until throwing at all times from before to after catching without regard as to the timing when the fielder catches the ball.

In this way, there is no need to make the timing of operational input (instruction of throw destination) match the timing of catching of the fielder. It becomes possible to immediately input an instruction (instruction of throw destination) at one judgement on the spot from the stage where the batter hits back the ball. Due to this, it becomes possible to designate the throw destination without causing stress in accordance with the speed of thinking of the user. Further, it is possible to determine motions before catching, so it is possible to make the series of motions from the catching to throwing smoothly shift.

As explained above, in FIGS. 3A to 3G, the explanation was given of the case where there was an operational input of the user around the catching action. For example, a group of motions corresponding to the throw destination may be combined with the group of motions up to that stage if at a timing after any of FIGS. 3B, 3C, 3D, and 3E. In combining motions, the group of motions up to that stage and the group of motions corresponding to the throw destination instructed may be combined on the same time axis or a group of motions corresponding to the throw destination may be connected with the group of motions up to that stage.

Above, an explanation was given of the case where there was no advance input designating the throw destination before the control of the display of the action of the fielder 61 by the group of motions. If the user designates the fielder covering second base as the throw destination as an advance input, the display changes by use of a similar group of motions as the group of motions used at FIGS. 3B to 3G.

In the example shown in FIGS. 3A to 3G, if there is no advance input of the user, the fielder covering second base is made the throw destination. Therefore, the explanation will be made using FIGS. 4A to 4G of the case of an operational input designating a fielder covering a base other than second base as the throw destination when the movement of the fielder is controlled for display by a group of motions in a state with no advance input of the user.

In the following explanation, before the fielder 61 catches the ball (for example, at the stage of FIG. 4B), the fielder covering third base is designated as the throw designation by an operational input of the user. Here, the change in the display image from the state waiting for catching to the catching (FIGS. 4A, 4B, and 4C) is the same as the example shown in FIGS. 3A, 3B, and 3C, so the explanation will be omitted. Note that in FIG. 4, 72 indicates a base, 91 a fielder, and 92 a glove.

After the catching pose of the fielder 61 (see FIG. 4A), for example, after FIG. 4B, the action of the fielder 61 is controlled for display by the optimal group of motions determined by the computer. At this stage (see FIG. 4B), if the fielder covering third base is designated as the throw destination by the operational input of the user, the fielder covering third base is determined as the throw destination. A group of motions different from the group of motions determined by the computer, however, becomes necessary. That is, a group of motions for throwing the ball 70 to the fielder covering third base becomes necessary.

In this case, the motion changes so that first the ball 70 is caught by the fielder 61 and then the fielder 61 can throw the ball 70 toward the fielder covering third base. The state of the fielder 61 catching the ball 70 is shown in FIG. 4C. The state of the fielder taking a step for a throw motion toward the fielder covering third base is shown in FIG. 4D. Further, FIG. 4E shows the state of the fielder 61 raising the ball 70 for throwing it toward the fielder covering third base.

Next, FIG. 4F shows the motion after the fielder 61 throws the ball 70. Further, FIG. 4G shows the motion of the fielder 91 covering third base receiving the ball 70. In the example of FIG. 4G, the scene of the fielder 91 catching the ball 70 while running to third base is shown.

In this way, as shown in FIGS. 3A to 3G and FIGS. 4A to 4G, it is possible to receive a throw destination by operation of the keypad 50 from before the fielder catches the ball. Further, even if the group of motions for making the fielder act is determined and the action of the fielder in that group of motions is being expressed, it becomes possible to express the action of the fielder by natural motions by combining motions if at a stage up to the elapse of a certain degree of change in state.

Next, an explanation will be given of an example of concerted play relating to throwing a ball between fielders using FIGS. 5A to 5D. In the above FIG. 3G, the scene of the fielder 81 shifting to the action of stepping on second base is shown. For example, when there are already runners on first base and second base at the point of time of FIG. 3A, from FIG. 3G, it is sometimes judged better for the progress of the game to make the fielder 81 throw to the fielder covering third base rather than making it cover second base.

In this case, an advance input of the user can be accepted before the fielder 81 receives the ball thrown from the fielder 61. That is, an advance input designating the throw destination for the fielder 81 can be received from the stage where the fielder 61 throws the ball 70 (see FIG. 3D). For example, in the scene extending over FIG. 3D, FIG. 3E, FIG. 3F and FIG. 3G, if there is no operation by the user designating the throw destination, it is judged that the user has not instructed the throwing of the ball. If there is no instruction of throwing the ball from the user, the neutral state of the fielder 91 (waiting pose of the fielder 91), is formed (not shown). The action of shifting to the neutral state of the fielder 91 is similar to the action of shifting to the neutral state of the fielder 61 explained with reference to FIG. 2A, FIG. 2B, FIG. 2C, FIG. 2D, FIG. 2E, FIG. 2F and FIG. 2G.

Further, in the scene of FIGS. 3D to 3G and the pose immediately before throwing (for example, corresponding to the motion of FIG. 2E), where there is a button operation from the user designating the throw destination, a series of motions for throwing the ball 70 is formed for the fielder covering the base designated by the button operation.

Figure 5A:
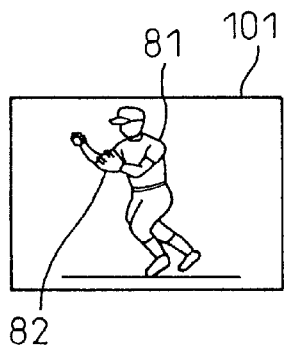
FIG. 5A, FIG. 5B, FIG. 5C, and FIG. 5D are views explaining another example of motions in throwing between players according to an embodiment of the present invention.
Figure 5B:
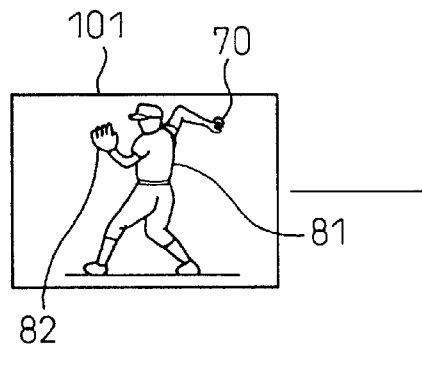

If the fielder covering third base is designated as the throw destination by an operational input of the user, which fielder is covering third base is judged in accordance with the progress in the game. Further, as shown in FIG. 5A, motions are formed after FIG. 3G. That is, the motions are changed so as to enable the fielder 81 to throw the ball toward the fielder covering third base. FIG. 5B shows the scene of the fielder 81 taking the ball 70 from the glove 82 and raising it to throw it toward the fielder covering third base.

Figure 5C:
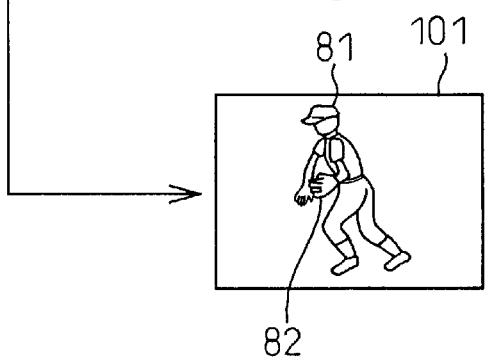
Figure 5D:
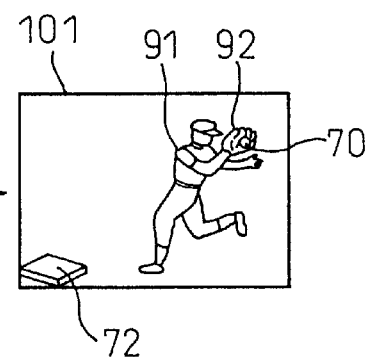
Figure 8:
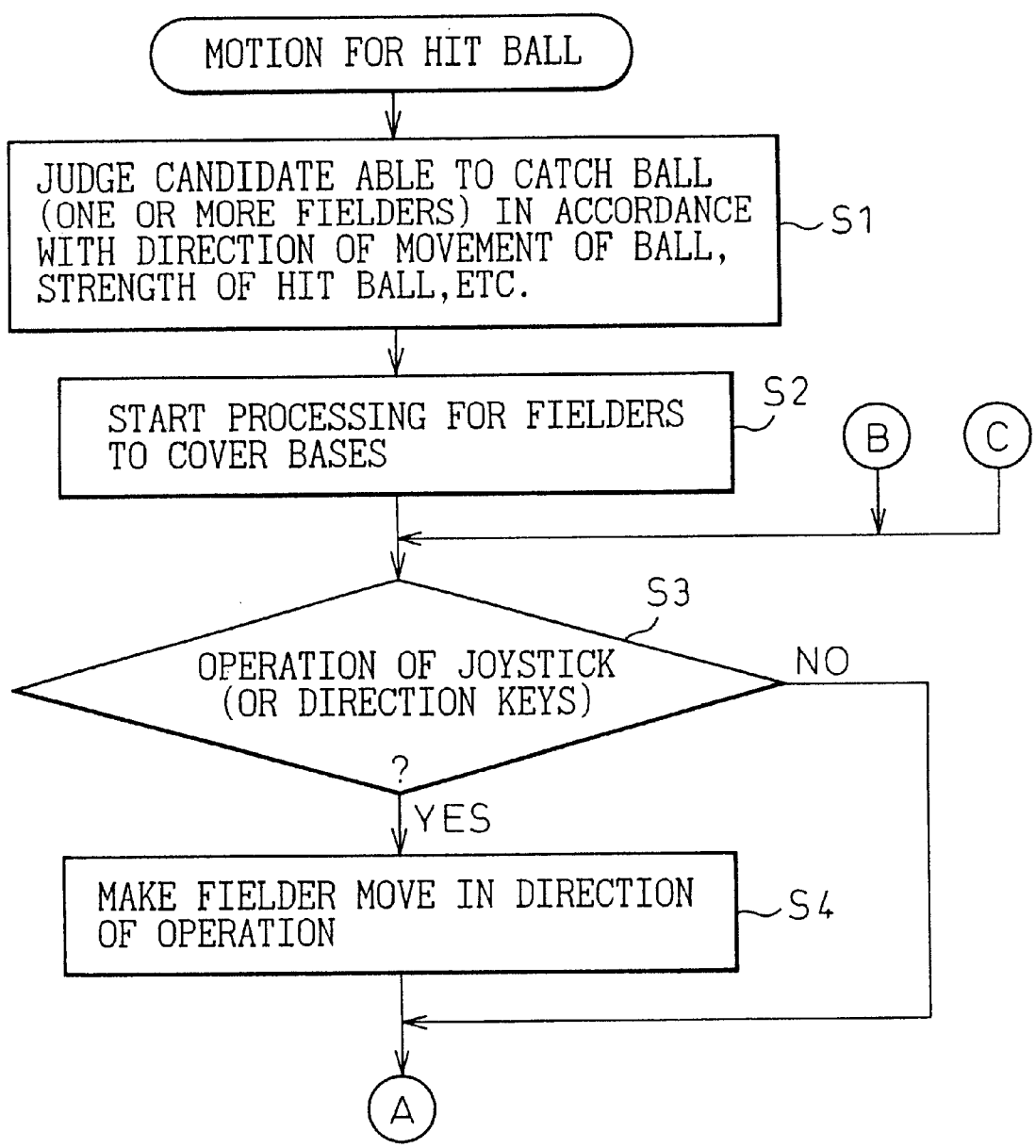
FIG. 8 is a flow chart for explaining an example of operation according to an embodiment of the present invention.

Next, in FIG. 5C, the state after the fielder 81 throws the ball 70 is formed. On the other hand, in FIG. 5D, the motion of the fielder 91 covering third base receiving the ball 70 is formed. In the example of FIG. 5D, the scene of the fielder 91 catching the ball 70 while running to third base 72 is shown.

Next, an explanation will be given of an example of data management relating to a group of motions using FIG. 6 and FIG. 7. FIG. 6 and FIG. 7 are views explaining the relation between the group of motions and data for selecting the group of motions in the present embodiment. Note that the data set in FIG. 6 and FIG. 7 is read from for example the CD-ROM 19 and stored in the work area 13C of the RAM 13.

FIG. 6 and FIG. 7 show the motion information relating to catching and throwing set for each fielder. The motion information relating to catching means a plurality of types of groups of motions assigned for each direction leading toward catching by the fielder. Each group of motions includes the number of frames, amount of movement per frame, catching range, height of the glove at the time of catching, range of catchable height, throwing direction, and throwable distance linked together.

The "number of frames" indicates the number of frames used for making a series of motions change. The "number of frames" specifically means the number of frames required from the catching pose of the fielder to catching. The "amount of movement per frame" means the distance which the fielder can move over per frame. The "catching range" indicates the distance at which a fielder can catch a ball given with reference to the position of the fielder. The "height of the glove at the time of catching" indicates the height at which the glove is positioned given with reference to the surface of the baseball field. The "range of catchable height" indicates the height at which the fielder can catch the ball given with reference to the surface of the baseball field. The "throwing direction" indicates the direction in which the ball is thrown given with reference to the orientation of the fielder at the time the fielder throws the ball. The "throwable distance" indicates the maximum distance from the fielder to where he throws the ball.

The data will be explained in further detail next. The "direction" column is set with data indicating 360 degree directions about the position of the fielder such as A, B, C, and D. In FIG. 6, for example, the direction A may be made forward from the fielder, the direction B toward the left from the fielder, the direction C toward the back from the fielder, and the direction D toward the right from the fielder.

The "group of motions" column stores the groups of motions linked with the fielders (motion data defining motion). In FIG. 6, the groups of motions are shown by numbers (#) for identifying the groups of motions. The groups of motions are set linked with the directions of movement of the fielder. As shown in FIG. 6, a plurality of groups of motions are linked with each of the directions of movement.

In the present embodiment, the direction A has for example the groups of motions #11, #12, #13, #14, #15, . . . linked with it. The direction B has for example the groups of motions #21, #22, #23, #24, . . . linked with it. The direction C has for example the groups of motions #31, #32, #33, #34, . . . linked with it. Further, the direction D has for example the groups of motions #41, #42, #53, #44, . . . #M (M is a natural number) linked with it.

The "number of frames" column is set with the amount of frames linked with the groups of motions and required from the state of the start of the catching action in a series of motions to the end of the catching action (for example, just before throwing).

In the present embodiment, the number of frames corresponding to the groups of motions #11, #12, #13, #14, #21, #22, #23, #31, #33, #44, #42, and #43 is for example set to "20". Further, the number of frames corresponding to the groups of motions #15, #24, #34, #44, . . . #M is set to for example "10". Note that the number of frames of a group of motions is set to a number of frames suitable for displaying the catching action of the fielder by the group of motions realistically and smoothly by the optimal change of state.

The "amount of movement per frame" is set with the distance over which a fielder can move per frame in a group of motions linked with the groups of motions. The amount of movement per frame corresponds to the distance of movement of the position of the fielder acting by a group of motions every time the displayed image of the frame is updated.

Further, the distance of movement is set in units of meters (m) assuming a distance in the case where the baseball field defined in the virtual space is the same size as an actual baseball field. Note that the same applies to the units of distance, amount of movement, and height as well. The values set in the "amount of movement per frame" column are for example positive real numbers.

In the present embodiment, the amount of movement per frame for the groups of motions #11, #12, #13, #14, and #15 is for example set to 0.30 m. The amount of movement per frame for the groups of motions #21, #22, #23, #24, #41, #42, #43, #44, and #M is for example set to 0.20 m. The amount of movement per frame for the groups of motions #31, #32, #33, and #34 is for example set to 0.15 m.

The "catching range" column set with a range in which the ball can be caught in a group of motions linked with the groups of motions. The catching range is expressed by the distance of the range of movement where the movement of the fielder can be expressed realistically and smoothly in a group of motions given with reference to the position of the fielder. In FIG. 6, L1, L2, L3, L4, L5, and L6 show the distances which can be moved over from a reference point given with reference to the position of the fielder. The values set for L1 to L6 are for example all positive real numbers.

In the present embodiment, the catching range for each of the groups of motions #11, #12, #13, and #14 is for example L1 to L2 (range from distance L1 away from position of fielder to less than distance L2). The catching range for the group of motions #15 is for example less than L1 (range of less than distance L1 from position of fielder).

The catching range for the groups of motions #21, #22, #23, #41, #42, and #43 is for example L3 to L4 (range from distance L3 away from position of fielder to less than distance L4). The catching range for the groups of motions #24, #44, #M is for example less than L3 (range of less than distance L3 from position of fielder).

The catching range for the groups of motions #31, #32, and #33 is for example L5 to L6 (range from distance L5 away from fielder to less than distance L6). The catching range for the group of motions #34 is for example less than L5 (range of less than distance L5 from fielder).

The "height of glove at catching" column is set with the height of the glove when the fielder catches the ball in each group of motions linked with the groups of motions. The values set here are for example positive real numbers.

In the present embodiment, the height of the glove at the time of catching for the groups of motions #11, #15,#21, #24,#31,#34,#41, and #44 is for example HI. The height of the glove at the time of catching for the groups of motions #12, #22, #32, and #42 is for example H2. The height of the glove at the time of catching for the groups of motions #13, #23, #33, and #43 is for example H3. The height of the glove at the time of catching for the groups of motions #14 and #M is for example H4.

The "range of catchable height" column is set with range of height where the fielder can catch the ball by each group of motion linked with the groups of motions. The range of catchable height is set to the height of the glove at the time of catching given with reference to the surface of the field. The values set here are for example positive real numbers.

In the present embodiment, a group of motions with a height of the glove at the time of catching of "H1" is set with for example a range of a height 0 to less than h1 (0 (m) to h1). A group of motions with a height of the glove at the time of catching of "H2" is set with for example a range of a height h1 to less than h2 (h1 to h2). A group of motions with a height of the glove at the time of catching of "H3" is set with for example a range of a height h2 to less than h3 (h2 to h3). A group of motions with a height of the glove at the time of catching of "H4" is set with for example a range of a height h3 to less than h4 (h3 to h4). Note that the values taken by h1, h2, h3, and h4 are positive real numbers.

In this way, the groups of motions at the directions A, B, C, D, . . . are set for each height of the glove at the time of catching. The "height of the glove" indicates the height from the surface of the baseball field to the glove given with reference to the surface at the catching pose. For example, the values of H1 (0.05 m), H2 (0.58 m), H3 (1.10 m), and H4 (1.98 m) are set. The range of catchable height is determined in accordance with the height of the glove at the time of catching.

For example, the values h1, h2, and h3 showing the two boundary values of the "range of catchable height" are calculated by the following equations 1, 2, and 3:

$$h1=(H1+H2)/2 \qquad 1$$

$$h2=(H2+H3)/2 \qquad 2$$

$$h3=(H3+H4)2 \qquad 3$$

Further, the maximum value of the "range of catchable height" is for example made "h4". According to this, the "range of catchable height" is set to for example 0 (m) to h1, h1 to h2, or h3 to h4.

Figure 9:
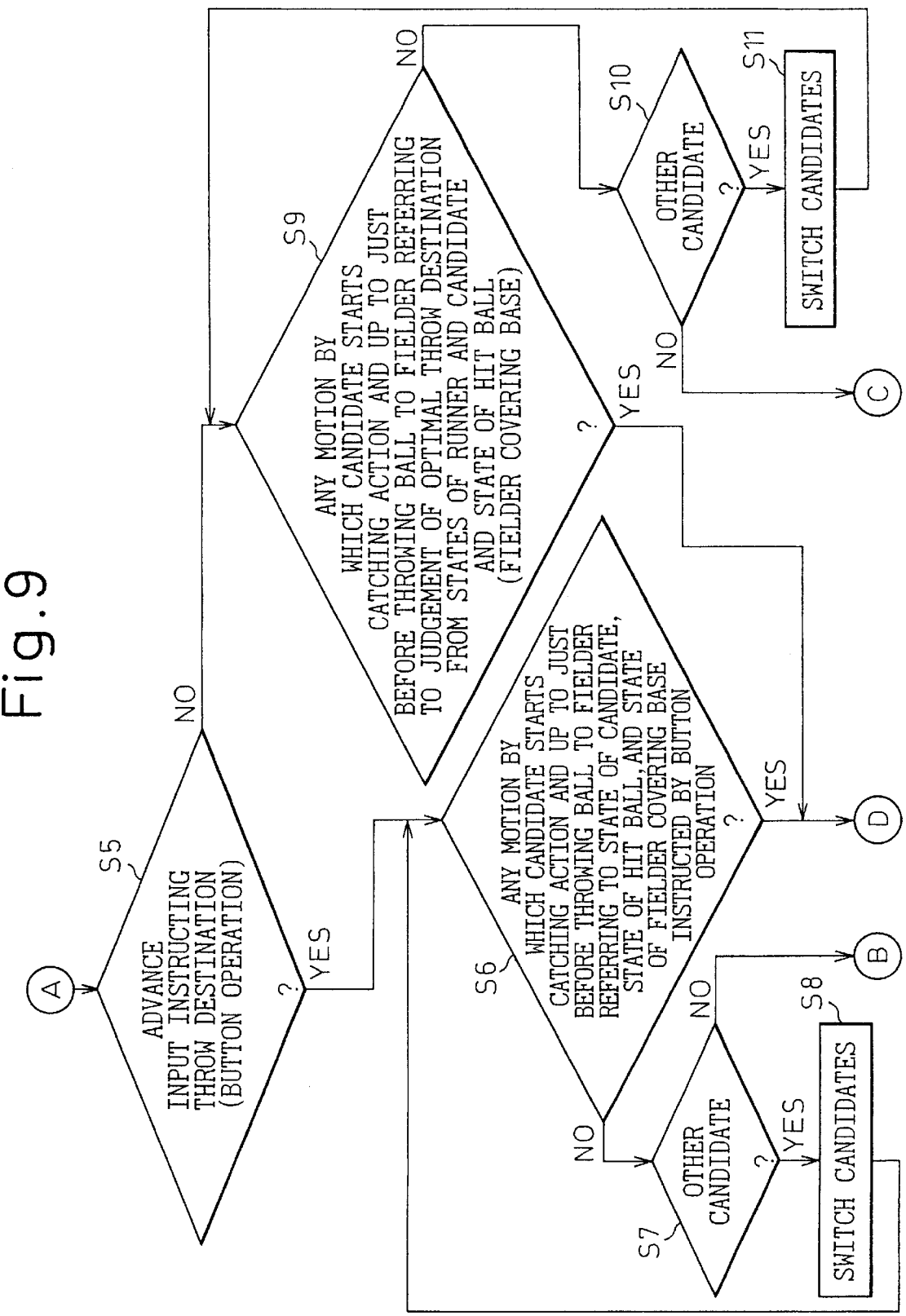
FIG. 9 is a flow chart for explaining an example of operation according to an embodiment of the present invention as a continuation of FIG. 8.
Figure 10:
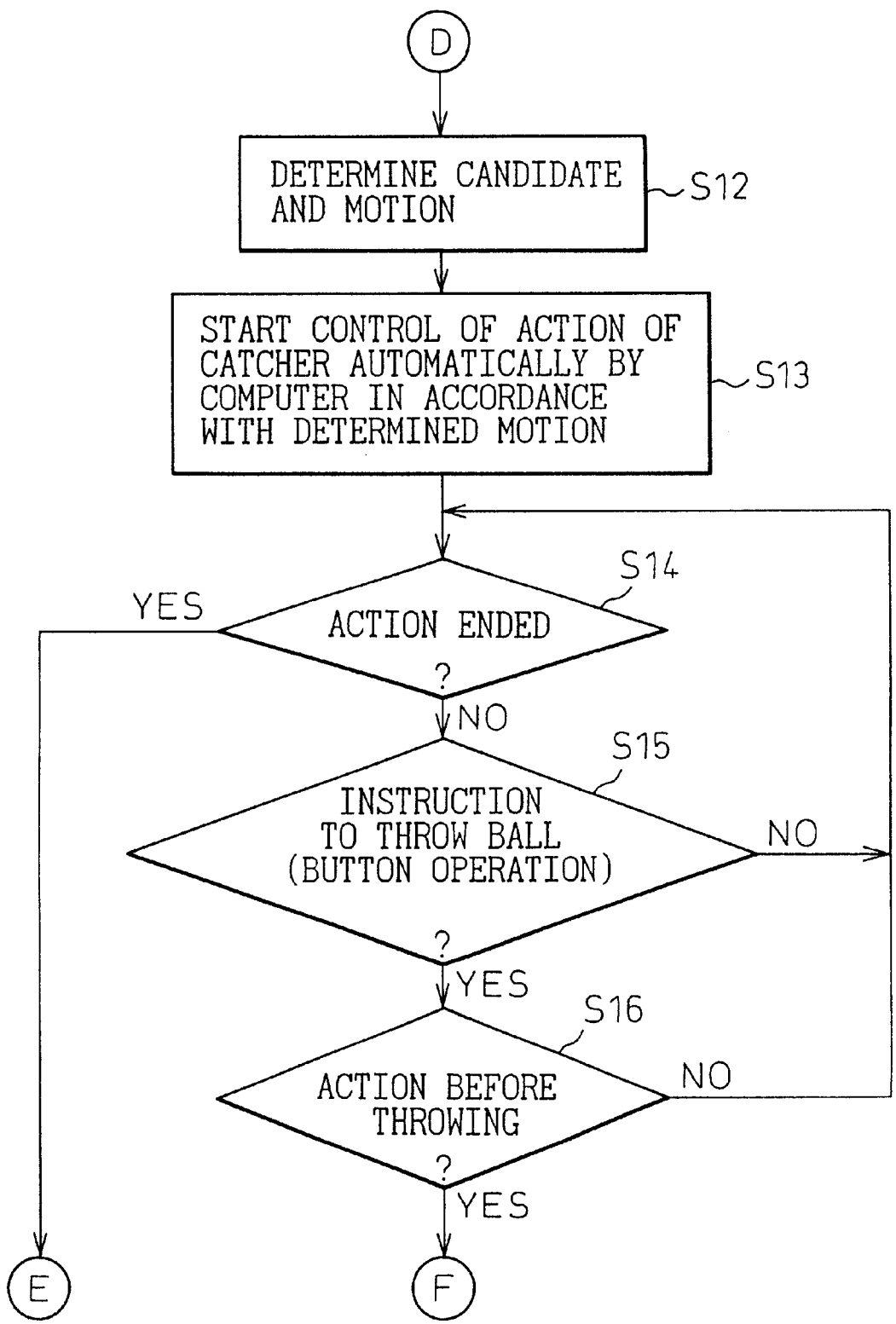
FIG. 10 is a flow chart for explaining an example of operation according to an embodiment of the present invention as a continuation of FIG. 9.
Figure 11:
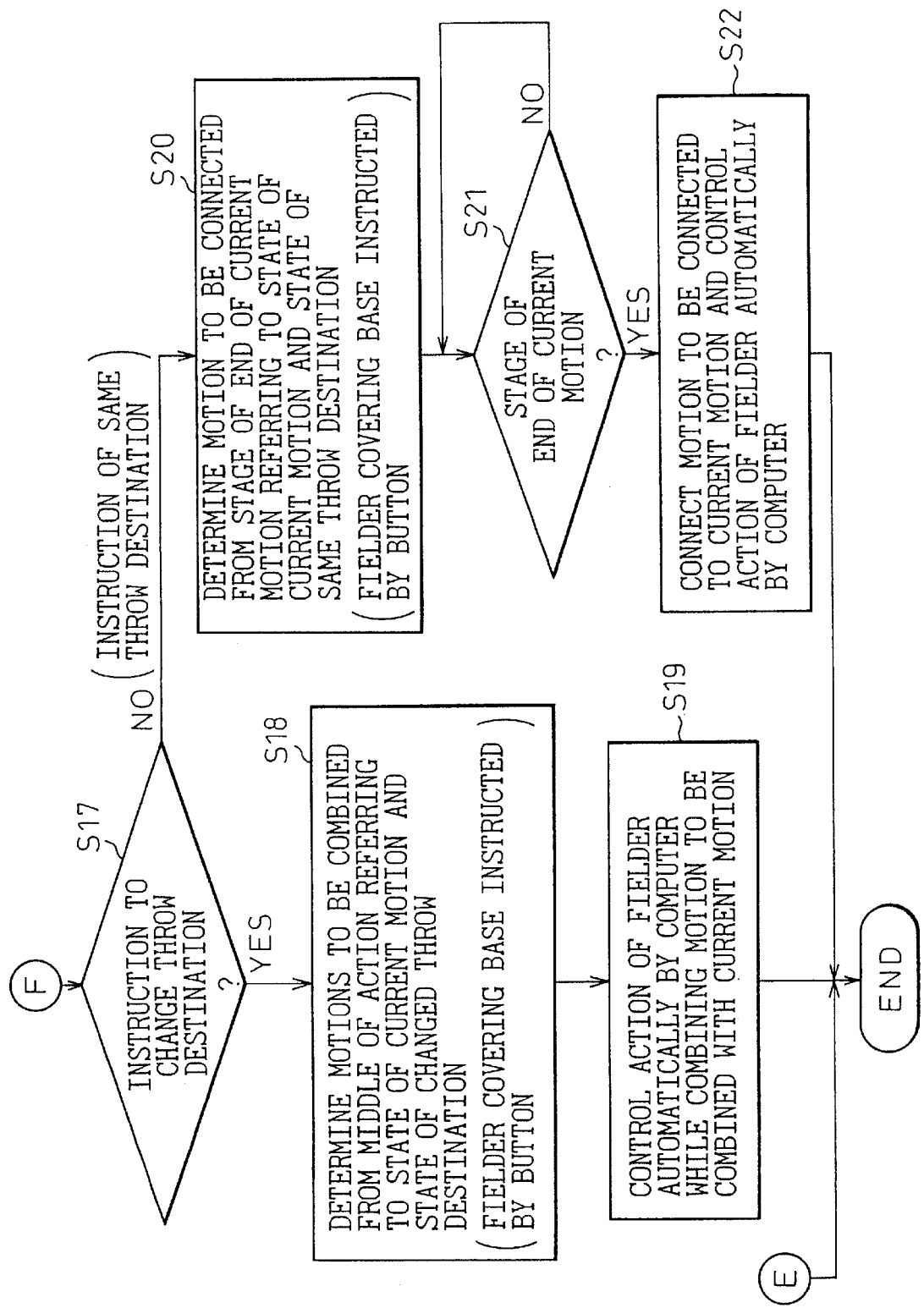
FIG. 11 is a flow chart for explaining an example of operation according to an embodiment of the present invention as a continuation of FIG. 10.
Figure 12:
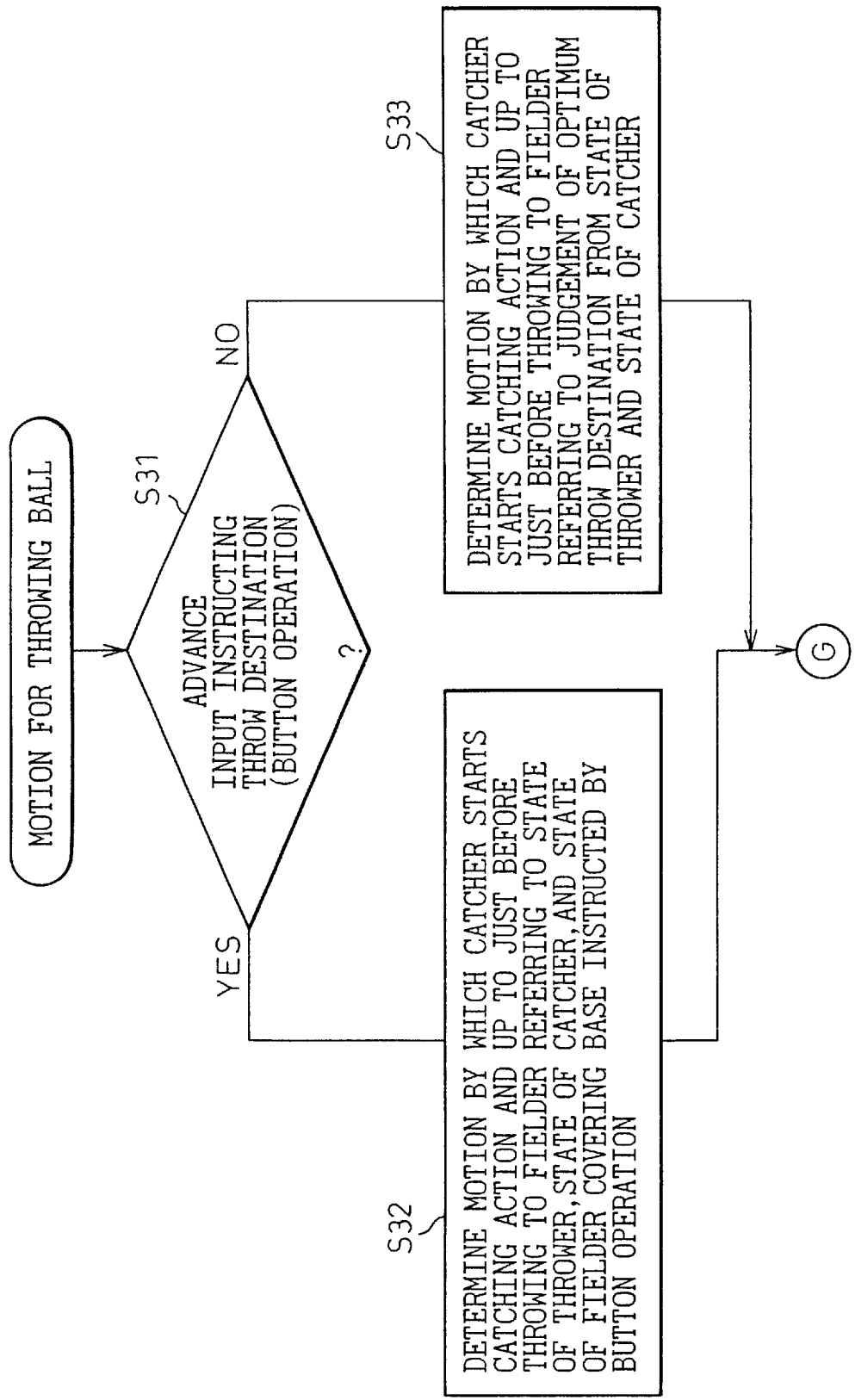
FIG. 12 is a flow chart for explaining an example of operation according to an embodiment of the present invention.
Figure 13:
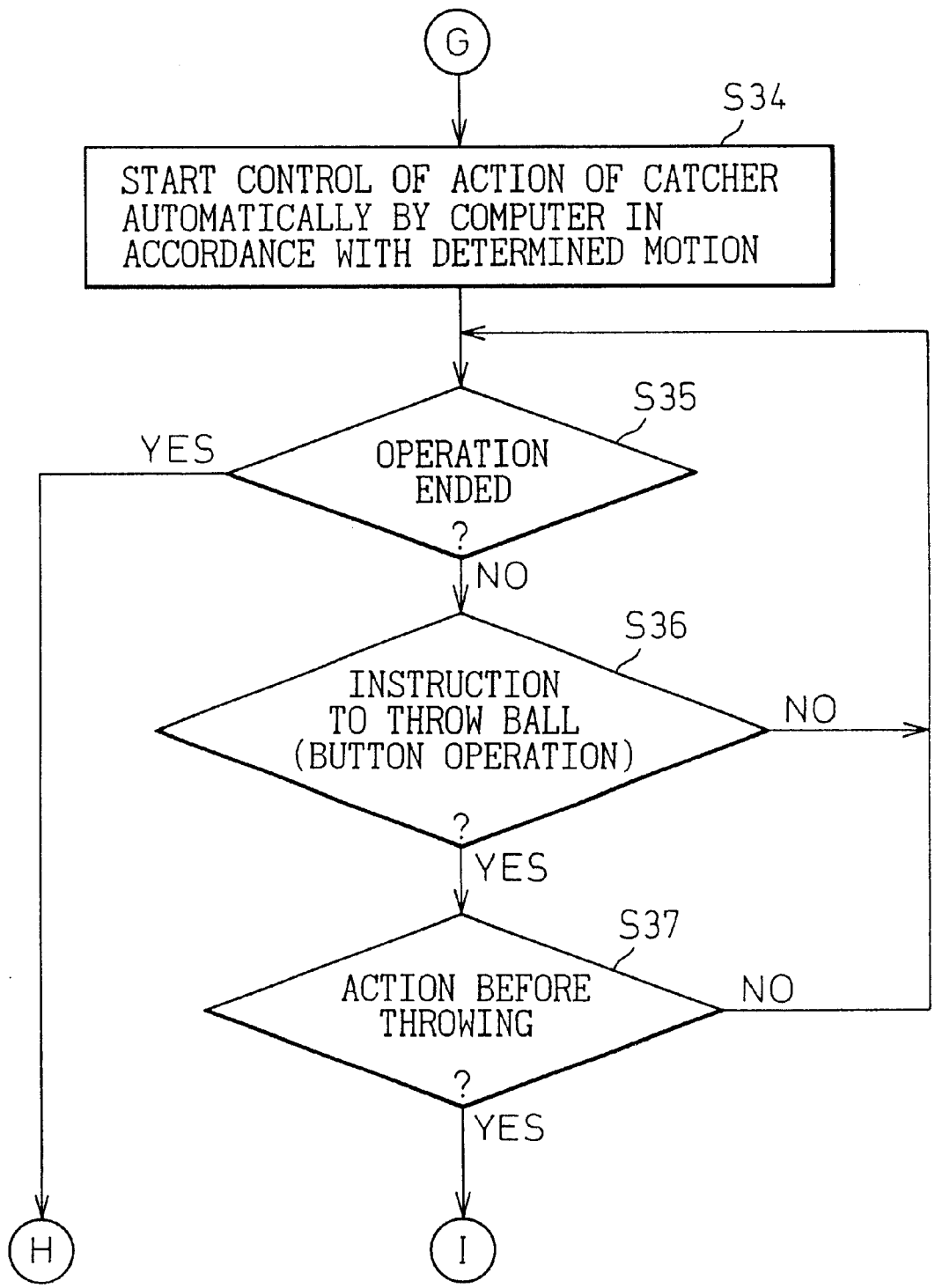
FIG. 13 is a flow chart for explaining an example of operation according to an embodiment of the present invention as a continuation of FIG. 12.
Figure 14:
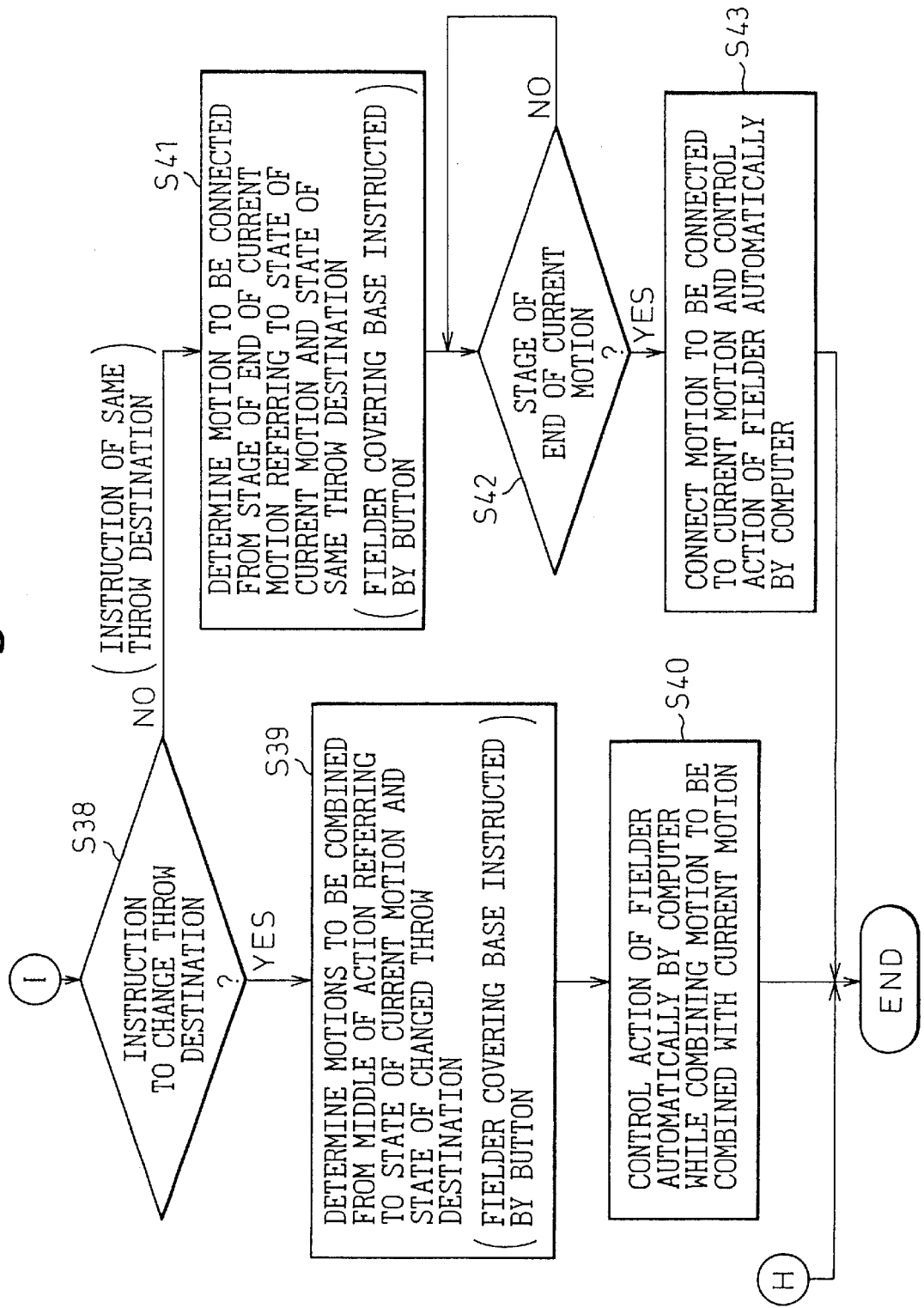
FIG. 14 is a flow chart for explaining an example of operation according to an embodiment of the present invention as a continuation of FIG. 13.

Next, as shown in FIG. 7, the "throwing direction" column is set with the throwing direction in each group of motions linked with the groups of motions. In the example of FIG. 9, for example, the throwing direction is determined in advance in 360 degree directions such as for example forward, right, left, and back.

A group of motions with a "forward" throwing direction is for example a group of motions where an infielder throws the ball to the catcher on home base. A group of motions with a "right" throwing direction is for example a group of motions where the shortstop throws the ball to the third baseman covering third base. A group of motions with a "left" throwing direction is for example a group of motions where the second baseman throws the ball to the first baseman covering first base. A group of motions with a "back" throwing direction is for example a group of motions where the pitcher throws the ball to the second baseman covering second base or the shortstop.

The "throwable distance" column set with a maximum distance over which the ball flies when thrown by the action of a fielder by each group of motions linked with the groups of motions. In FIG. 7, D1 and D2 indicate the flight distance when the ball is thrown given with reference to the position of the fielders. Here, D2 is set larger in distance than D1. The values taken by D1 and D2 are positive real numbers.

In the example of FIG. 7, the throwable distance for the groups of motions #11, #12, #13, #14, #21, #22, #23, #24, #31, #32, #33, 34, #41, #42, #43, and #44 is for example "D1 to D2" (range D1 away and less than distance D2). The throwable distance for the groups of motions #15 and #M is "0 (m) to D1" (range of less than distance D1).

A group of motions with a throwable distance of "D1 to D2" is for example a group of motions by which a ball is thrown overhand. Further, the group of motions with a catchable distance of "0 (m) to D1" is for example a group of motions by which a ball is thrown underhand.

The baseball game is played out while referring to the data shown in the above FIG. 6 and FIG. 7. That is, when the ball is made to move in the baseball game, the number of frames is obtained from the data for the above group of motions. The position of the ball at the point of time when the display is changed by exactly the number of frames obtained from the display position of the ball is predicted.

The distance over which a fielder can be made to move by a group of motions is calculated from the number of frames corresponding to the group of motions and the amount of movement of the fielder per frame. It is sequentially judged if the fielder can reach the position of the ball obtained by the prediction for each group of motions based on the calculated distance.

When using one group of motions, it is judged if the fielder could catch the ball by that group of motions if the fielder could reach the future position of the ball. If it is judged that he could catch the ball, the series of motions expressed by that group of motions is changed on the display screen. Note that to predict the position of the ball at the point of time after displaying exactly that number of frames on the screen, calculation of the direction of movement, speed, etc. of the ball becomes necessary.

When there has been no instruction input from the user up until throwing during the change in display by the group of motions, however, as mentioned above (see FIG. 2), processing is executed to shift the fielder from the catching pose to the catching action, then finally a neutral state is set. In this case, part of the group of motions is used. That is, the series of motions up to catching is used.

On the other hand, when there has been an instruction from the user up until throwing during the change in display by the group of motions, as explained above (see FIG. 3 and FIG. 4), processing is executed to shift the fielder from the catching pose to the catching action, then execute the throwing action. In this case, all of the catching action and throwing action are taken out from the group of motions and converted to movement of the fielder.

Note that in the present embodiment, the groups of motions, that is, the configuration of the motion data, are not particularly limited. That is, it is also possible to set the series of motions from the catching pose to the throwing action as one group of motions or possible to provide the series of motions from the catching pose to the catching action and the series of motions from the catching state to the throwing state as independent groups of motions and configure the data to enable these to be linked and connected at any time. The present invention is not limited to the above configuration.

Further, depending on the memory capacity, it is possible to give groups of motions for all 360 degrees of direction about the fielder, but it is also possible to limit the direction of movement such as to the four directions of forward, back, left, and right. In this case, the desired direction of movement of the fielder will not match the forward direction from the position of the fielder (for example, 0 degree), right direction (for example, 90 degrees clockwise), back direction (for example, 180 degrees clockwise), or left direction (for example 270 degrees clockwise), so the direction of the fielder may be finely adjusted (rotated) to the closest direction. Of course, the directions of movement are not limited to four directions and for example may also be eight directions. The number of directions may be changed in various ways according to the amount of use of the memory, expression of the game, and other conditions.

Next, an explanation will be given of the operation according to the present embodiment. FIG. 8, FIG. 9, FIG. 10, FIG. 11, FIG. 12, FIG. 13, and FIG. 14 are flow charts for explaining the operation according to an embodiment of the present invention. The flow charts of FIG. 8 to FIG. 11 explain an example of the action of the catcher when a batter hits back the ball of the pitcher. That is, the flow charts shown in FIG. 12 to FIG. 14 explain an example of the action of the thrower when a fielder holding the ball such as the fielder catching the hit ball throws the ball to another fielder and shows the processing of the motions for the throwing.

First, an explanation will be given with reference to FIG. 8 to FIG. 11 using as an example the scene of the batter hitting the ball. First, the fielders able to catch the ball are determined in accordance with the hit direction in which the batter hit the ball (step S1). One or more fielders positioned in a range of for example 20 to 30 degrees with respect to the hit direction become candidates for the catching. Note that in the case of a bunt, at the time of selection of candidates, the pitcher, catcher, etc. become candidates for catching the ball regardless of the angle at which the ball was hit. Further, in the case of an outfield fly ball, at the time of selection of candidates, the infielders are excluded from the candidates from the start. Further, in the case of a liner to the left, the left outfielder alone becomes the candidate for catching the ball.

Next, processing for the fielders to cover the bases is started (step S2) and the operation with respect to the joystick 50e provided at the keypad 50 (or keys indicating directions provided at the keypad 50) is confirmed (step S3). When the operation of the joystick 50e is confirmed (step S3: YES route), processing is executed for making the fielder selected for control move on the field in accordance with that operation (step S4).

In the case of the joystick 50e, for example, the direction for making the fielder move and the amount of movement are determined in accordance with the tilt state of the joystick. Further, when using the keys indicating the directions, for example, the keys are linked with the up, down, left, and right directions and the fielder is made to move in the direction linked with a depressed key in accordance with the amount of depression of the key.

When no operation of the joystick 50e has been confirmed (step S3: NO route) or after the execution of the processing of step S4, an advance input designating the throw destination is confirmed (step S5). The "advance input" indicates a button operation for designating a throw destination for a fielder covering a base designated by the user before a fielder catches the hit ball after the batter hits back the ball. This button operation enables one of the fielders covering first base, second base, third base, and home base to be designated as the throw destination.

Here, when the button corresponding to first base is operated, an advance instruction for throwing the ball is input for the fielder covering first base. Similarly, when the button corresponding to second base is operated, an advance instruction for throwing the ball is input for the fielder covering second base. When the button corresponding to third base is operated, an advance instruction for throwing the ball is input for the fielder covering third base. When the button corresponding to home base is operated, an advance instruction for throwing the ball is input for the fielder covering home base.

Note that the relationship between the buttons and throw destination is not limited to a one-to-one correspondence. It is also possible to designate the throw designation by a combination of two or more buttons or one or more buttons and the joystick.

When there was an advance input designating the throw destination (step S5: YES route), first, the state of one candidate (position, pose, etc.), the state of the hit ball (direction of hit ball, strength of hit ball, etc.), and the state of coverage of the fielder designated by advance input are confirmed. Whether a candidate can catch the ball is judged with reference to the results of this confirmation.

A candidate is assigned in advance with a plurality of groups of motions including a series of motions for starting the catching action and continuing up to just before throwing. Therefore, it is judged if there is a group of motions for starting catching among the plurality of groups of motions of the candidate with reference to the results of the confirmation (step S6).

In this case, the minimum time required up until the catching action in the catching action is calculated for each group of motions of the candidate. Further, since the path of the hit ball is calculated by being read in advance, the predicted position of the hit ball at the point of the minimum required time is calculated for each group of motions. The required time for the candidate to reach the predicted position of the hit ball thus calculated is calculated from the range of the speed of movement of the candidate.

Further, the minimum required time and the actually required time are compared. When the result is that the minimum required time is more than the required time, it is judged that the candidate can reach the hit ball position by the group of motions used for the above calculation. In this case, since it is judged that the candidate has successive motions for starting catching (step S6: YES route), the series of motions is confirmed and that candidate is determined as the catcher (step S12).

Figure 15:
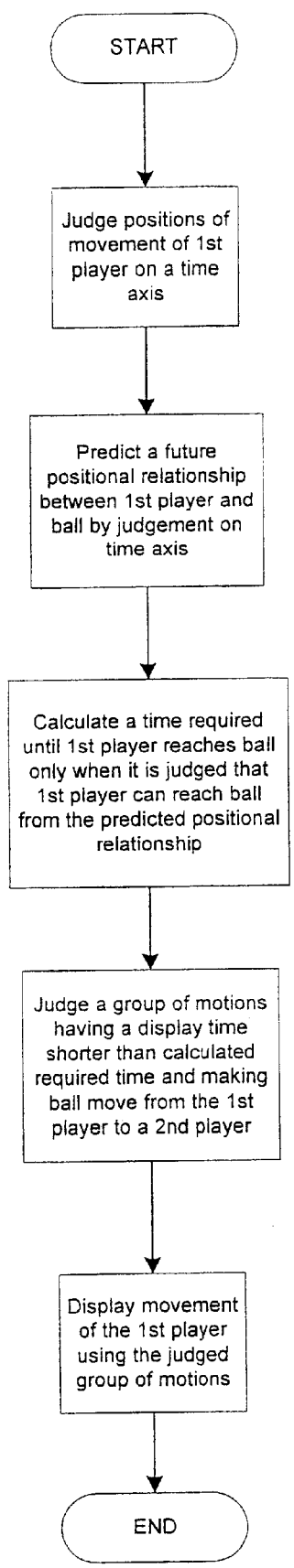
FIG. 15 is an exemplary flow diagram which illustrates a portion of a computer readable program which realizes a ball-playing game indirectly controlling movement of a ball in accordance with movement of a player.

FIG. 15 is an exemplary flow chart illustrating an aspect of the invention with regard to the aforementioned features. In particular, it illustrates a portion of a computer readable program which judges positions of movement of a first player and a ball on a time axis, predicting a future positional relationship between the first player and the ball by the judgement on the time axis, calculating a time required until the first player reaches the ball only when it is judged that the first player can reach the ball from the predicted positional relationship, judging a group of motions having a display time shorter than said calculated required time and making the ball move from the first player to a second player, and displaying movement of the first player using the judged group of motions.

The action of the catcher is automatically controlled by the computer in accordance with the group of motions, that is, the series of motions, determined at step S12 (step S13). When it is judged at step S6 that the result of the comparison of the minimum required time and the actually required time is that the minimum required time is not more than the actually required time, it is judged that the candidate cannot reach the hit ball position by the group of motions used for the calculation.

In this case, it is confirmed if there is another candidate (next candidate) (step S7). When there is a next candidate (step S7: YES route), the next candidate is switched to (step S8) and the processing returns to step S6. At step S6, processing analogous to the above is executed for the candidate switched to at step S8.

When it could not be confirmed in the series of processing of the above step S6, step S7, and step S8 that there was a suitable series of motions even when executed for all candidates, the processing returns to step S3. Processing analogous to the above is then executed by step S3.

Further, when no advance input designating a throw destination was confirmed at step S5 (NO route), it is possible to judge to which fielder covering which base the ball should be thrown from the state of one of the candidates (position, pose, etc.), state of the hit ball (direction of the hit ball, strength of the hit ball, etc.), state of coverage by fielders, state of runners, and other related attributes.

For example, when a ball is hit back toward the shortstop in a state with no runner on first base, it is judged best for the shortstop to throw to second base after catching the ball. Further, when the ball is a grounder heading toward first base, the first baseman moves forward to start the action of catching the ball, so it is judged best for the pitcher to cover first base and to throw to the pitcher.

Whether a candidate can catch the ball is judged with reference to the above results of judgement. As explained above, a candidate, that is, a fielder, is assigned in advance with a plurality of groups of motions including a series of motions for starting the catching action and continuing up to just before throwing. Therefore, it is judged if there is a series of motions for starting catching among the plurality of groups of motions of a candidate with reference to the above results of judgement (step S9).

The prediction and calculation for each series of motions of each candidate are as explained with reference to step S6, so a repeat explanation will be omitted. When it is judged that a candidate has a series of motions leading to catching (step S9: YES route), the motions are confirmed and the candidate is determined as the catcher (step S12). The action of the catcher is controlled automatically by the computer in accordance with the series of motions determined at step S12 (step S13).

Further, when it is judged at step S9 that the candidate does not have a series of motions leading to catching (NO route), it is confirmed if there is another candidate (next candidate) (step S10). When there is a next candidate (step S10: YES route), the candidates are switched (step S11). At step S9, analogous processing to the above is executed for the candidate switched to at step S11.

When it could not be confirmed in the series of processing of the above step S9, step S10, and step S11 that there was a suitable series of motions even when executed for all candidates, the processing returns to step S3. Processing analogous to the above is then executed by step S3.

If the action of the catcher is started at step S13, it is judged if the action has ended at step S14 (step S14). If the end of the action is confirmed at step S14 (YES route), the processing ends. On the other hand, when the action has not ended (step S14: NO route), the processing proceeds to step S15.

At step S15, an instruction for throwing the ball during execution of the motion just before throwing is confirmed from the button operation. If the operation of the button is not confirmed (step S15: NO route), the processing returns to step S14 where the end of the action is again confirmed (step S14). On the other hand, when the operation of a button is confirmed (step S15: YES route), it is judged that an instruction for motions up to throwing has started and it is judged if the motion currently being processed is before throwing (step S16). This judgement is made by the degree of progress of the series of motions.

If the result of judgement is that the motion is after throwing (step S16: NO route), the processing proceeds to step S14. Here, when the motion currently being processed is in the action after throwing, processing is executed to continue the motion until just before throwing and place the movement of the catcher in the neutral state. Here, the neutral state indicates not the state of making the motion of the catcher shift to the throwing action, but the state of setting the ball at the chest level to enable it to be thrown at any time. Due to this, at step S14, the end of the action is confirmed and the processing ends. Next, the group of motions for throwing the ball to the throw destination is determined and the movement of throwing the ball is displayed again.

If there is an instruction up to throwing at step S15 (YES route) and the result of judgement at step S16 is that the action is before throwing (YES route), it is judged if the current throw destination and the throw destination instructed at step S15 (determined by button operation) do not match, that is, if the throw destination has been switched (step S17).

At step S17, it is judged to which fielder covering which base the ball has been instructed to be thrown to from the button operation confirmed at step S15. The throw destination is determined by this judgement. Note that after the batter hits the ball, processing is started for making the fielders start covering the bases, so at the processing stage of step S17, the throw destination can be changed in accordance with a button operation.

When it is judged at step S17 that the current throw destination and the throw destination instructed at step S15 (determined by button operation) match (step S17: NO route), the throw destination is not switched and the processing proceeds to step S20 instructing the same throw destination. On the other hand, if it is judged that they do not match (step S17: YES route), the processing proceeds to step S18 switching the throw destination.

At step S18 (when switching the throw destination), processing for determining the series of motions to be combined with the current motions from among the group of motions of the catcher is performed with reference to the state of progress of the current motions and the state of the throw destination switched to, that is, the fielder of the throw destination. The series of motions determined here are motions until finishing the throwing action to the throw destination switched to.

If the motions to be combined are determined in this way, the action of the fielder (catcher) is automatically controlled by the computer until the throwing action finishes while combining the series of motions thus determined with the current motions (step S19).

On the other hand, at step S20 (same throw destination before and after throwing), processing for determining the motion to be continued from the stage of the end of the current motion from among the group of motions of the catcher is performed with reference to the state of progress of the current motion and the state of the same throw destination, that is, the fielder of the throw destination. The series of motions determined here are motions until finishing the throwing action to the throw destination continued from the stage of the end of the current motion.

If the motions to be continued are determined in this way, it is judged if the current motions have reached the end stage (step S21). Until the current motions reach the end stage (step S21: NO route), the action of the catcher is continued by the current motions. Further, when the current motions reach the end stage (step S21: YES route), the motions determined at step S20 are continued from the end stage of the current motions and the action of the fielder (catcher) is automatically controlled by the computer until the end of the throwing action (step S22).

The above flow was explained centered on the fielder starting the catching action for a hit ball, but an analogous processing is executed as the action described in the above step S1 to step S22 at the time of catching even for a fielder of the side receiving the ball thrown from that fielder.

Here, the explanation will be made with reference to the fielder receiving the hit ball as the first fielder and the fielder catching the ball thrown from the first fielder as the second fielder. When the first fielder throws the ball he catches to the second fielder, the second fielder predicts the path of the ball and starts the catching action of the ball. At this time, the optimal catching motions are determined from the group of motions.

Even before the second fielder catches the ball, in other words, it is possible to input the next throw destination for the second fielder by a button operation without regard as to the timing at which the second fielder catches the ball. That is, when the throw destination is designated by a button operation of the user while the motions of the second fielder are being controlled for display by the group of motions already determined, the motions are combined so that the ball can be thrown to the latest throw destination regardless of the display of the movement of the second fielder. Due to this, in the same way as the first fielder controlled in movement by the series of motions for a hit ball, movement of the second fielder receiving the ball from the first player can also be realized.

The above flow of processing will be explained in further detail next. An explanation will be given taking as an example the scene where the first fielder catching the hit ball decides on the throw destination and throws the ball. At this time, advance input of the user for the second fielder is confirmed. That is, advance input of the throw destination by the user is confirmed (step S31). In this case as well, the existence of an advance input is confirmed from the button operation.

When the result is that an advance input has been confirmed (step S31: YES route), the state of the thrower trying to throw the ball or throwing the ball (indicating first fielder) (position, pose, throwing direction, etc.), the state of the catcher (indicating second fielder) (position, pose, direction of movement, etc.), state of coverage by the fielders instructed by the advance input, etc. are confirmed. The group of motions leading to the catching pose is determined from the plurality of groups of motions of the second fielder with reference to the results of the confirmation (step S32). The method of determination of the group of motions is similar to the case of the motion processing for the hit ball.

Further, when advance input was not confirmed (step S31: NO route), it is judged to which fielder covering which base the ball should be thrown to with reference to the state of the thrower trying to throw the ball or throwing the ball (indicating first fielder) (position, pose, throwing direction, etc.), the state of the catcher (indicating second fielder) (position, pose, direction of movement, etc.), the state of the fielders covering the bases, the state of the runners, and other related aspects. The optimal group of motions is determined with reference to the results of judgement (step S33). The method of determination of the group of motions is similar to that of the motion processing for the hit ball as explained above.

If the group of motions is determined in this way (step S32 or step S33), movement of the second fielder is automatically controlled by the computer in accordance with the series of motions using the group of motions (step S34).

If the action of the second fielder (catcher) is started at step S34, it is judged if the action has ended (step S35). If the end of the action has been confirmed (step S35: YES route), the processing ends. On the other hand, if the action has not ended (step S35: NO route), the processing proceeds to step S36.

At step S36, an instruction for throwing while executing a motion immediately before throwing is confirmed by a button operation. When operation of a button is not confirmed (step S36: NO route), the processing returns to step S35 and the end of the action is again confirmed (step S35). On the other hand, when the operation of the button is confirmed (step S36: YES route), it is judged that there was an instruction up to the throwing action and it is judged if the motion currently being processed is one before throwing (step S37). This judgement is made according to the degree of progress of the series of motions.

If the result of judgement is that the motion is after the throwing action (step S37: NO route), the processing returns to step S35. Here, when the motion currently being processed is already action after the throwing action, processing is executed to continue the motions until just before throwing and place the movement of the catcher in the neutral state. Here, the neutral state indicates not the state of making the motions of the catcher shift to the throwing action, but the state of setting the ball at the chest level to enable it to be thrown at any time. Due to this, at step S35, the end of the action is confirmed and the processing ends. Next, the motion for throwing the ball to the throw destination corresponding to the button operation is displayed.

If there is an instruction up to throwing at step S36 (YES route) and the result of judgement at step S37 is that the action is before throwing (YES route), it is judged if the current throw destination and the throw destination instructed at step S36 (determined by button operation) do not match, that is, if the throw destination has been switched (step S38).

At step S38, it is judged to which fielder covering which base the ball has been instructed to be thrown to from the button operation confirmed at step S36. The throw destination is determined by this judgement. Note that after the batter hits the ball, the fielders are processed to start covering the bases, so at the processing stage of step S38, the throw destination can be changed in accordance with a button operation.

When it is judged at step S38 that the current throw destination and the throw destination instructed at step S36 (determined by button operation) match (NO route), the throw destination is not switched and the processing proceeds to step S41 instructing the same throw destination. On the other hand, it is judged that they do not match (step S38: YES route), the processing proceeds to step S39 switching the throw destination.

At step S39 (when switching throw destinations), processing is performed for determining the series of motions to be combined with the current motions from the group of motions of the catcher with reference to the state of progress of the current motions and the state of the switched throw destination, that is, the fielder becoming the throw destination. The series of motions determined here are the motions until completing the throwing action to the switched throw destination.

If the motions to be combined in this way are determined, the action of the fielder (catcher) is automatically controlled by the computer until the throwing action is completed while the series of motions determined are combined with the current motions (step S40).

On the other hand, at step S41 (same throw destination before and after throwing), processing is performed for determining the motions to be continued to the end stage of current motions from the group of motions of the catcher with reference to the state of progress of the current motions and the state of the same throw destination, that is, the fielder becoming the throw destination. The series of motions determined here are the motions continued from the end stage of the current motions for completing the throw to the throw destination.

If the motions to be continued are determined in this way, it is judged if the current motions have reached the end stage (step S42). Until the current motions reach the end stage (step S42: NO route), the action of the catching is continued at the current motions. Further, when the current motions reach the end stage (step S42: YES route), the motions determined at step S41 are made to continue from the end stage of the current motions and the action of the fielder (catcher) is automatically controlled by the computer until the throwing action is completed (step S43).

As explained above, according to the present embodiment, it is possible to prepare a series of motions including a catching action in advance and, before using that series of motions to control the display of the movement of a fielder, to determine the optimal motions up to throwing by judgement of a computer in accordance with an operation of the user (advance input) or the state of the game. Due to this, it is possible for the user to designate any throw destination without regard as to the timing when the fielder catches the ball and to realistically and smoothly express continuous action of the fielder before and after the fielder catches the ball.

Further, it is possible to freely change the throw destination by performing an operation to switch the throw destination even while the movement of the fielder is being controlled for display in the series of motions by the computer.

Further, if the movement of a fielder is displayed and controlled by the series of motions by the computer and motions are changed to an extent where there is no operational input, processing is performed for shifting the fielder to the neutral state. Since the fielder starts taking a pose immediately before throwing the ball to the throw destination determined by advance input of the user or judgement of the computer before the motion changes from that immediately after catching to the neutral state, the user can finally instruct the optimal throw destination considering that pose.

In the above embodiments, the example was given of a baseball game as a ball-playing type game, but the present invention is not limited to this. It may be applied to any ball-playing game where a player catches a ball and sends the ball in any direction in accordance with the operation of the user such as soccer, basketball, American football, tennis, and ice hockey.

Further, the present invention can be applied to any of a specialized game machine, arcade machine, personal computer, portable information terminal, mobile phone, etc.

In the above embodiments, the program for realizing the embodiment of the present invention was stored in a CD-ROM or hard disk, but the present invention is not limited to this. It is also possible to store it on an MO, DVD, or other computer readable program product. Further, when downloading the above program on to a hard disk, it is possible to use a commercial network, the Internet, Intranet, Extranet, etc. for the network 111.

Summarizing the effects of the invention, according to the present invention, it is possible to obtain a computer readable program product storing a program of a ball-playing type game which can smoothly y express continuous action of a player before and after a player obtains a ball when throwing the ball in any direction in accordance with operation of the user in the ball-playing game, such a program, and a ball-playing type game processor and method.

While the invention has been described by reference to specific embodiments chosen for purposes of illustration, it should be apparent that numerous modifications could be made thereto by those skilled in the art without departing from the basic concept and scope of the invention.

What is claimed is:

1. A computer readable program product storing a program for a ball-playing type game which realizes a ball-playing game indirectly controlling movement of a ball in accordance with movement of a player, said program product storing a program for making a computer:
- judge positions of movement of a first player and a ball on a time axis,
- judge a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player,
- display movement of said first player using said judged group of motions,
- judge the group of motions for making said ball move from said first player to said second player from said plurality of groups of motions assigned to said second player in accordance with a future positional relationship between said first player and said ball judged on said time axis, and
- display movement of said second player using said group of motions judged for said second player along with displaying said movement of said first player.

2. A computer readable program product storing a program for a ball-playing type game which realizes a ball-playing game indirectly controlling movement of a ball in accordance with movement of a player,
said program product storing a program for making a computer:
- judge positions of movement of a first player and a ball on a time axis,
- judge an instruction for movement of said ball from said first player to said second player in response to an operation by a user,
- judge group of motions for making said ball move from said first player to a second player from a plurality of groups of motions assigned to said first player in accordance with a future positional relationship between said first player and said ball judged on said time axis, a plurality of groups of motions for making the ball move between players being assigned to each player,
- display movement of said first player using said judged group of motions,
- judge the group of motions for making said ball move from said first player to said second player from said plurality of groups of motions assigned to said second player in accordance with a future positional relationship between said first player and said ball judged on said time axis, and
- display movement of said second player using said group of motions judged for said second player along with displaying said movement of said first player.

3. A computer readable program product storing a program for a ball-playing type game which realizes a ball-playing game indirectly controlling movement of a ball in accordance with movement of a player,
said program product storing a program for making a computer:
- judge positions of movement of a first player and a ball on a time axis,
- predict a future positional relationship between said first player and said ball by said judgement on the time axis,
- calculate a time required until said first player reaches said ball only when it is judged that said first player can reach said ball from said predicted positional relationship, a plurality of groups of motions for making the ball move between players being assigned to each player and display times being assigned to each group of motions,
- judge a group of motions having a display time shorter than said calculated required time and making said ball move from said first player to a second player by said judged group of motions from said plurality of groups of motions assigned to said first player, and
- display movement of said first player using said judged group of motions.

4. A program product as set forth in claim 3, wherein said program further makes said computer:
- judge the group of motions for making said ball move from said first player to said second player from said plurality of groups of motions assigned to said second player in accordance with the group of motions judged for the first player and
- display movement of said second player using said group of motions judged for said second player along with displaying said movement of said first player.

5. A computer readable program product storing a program for a ball-playing type game which realizes a ball-playing game indirectly controlling movement of a ball in accordance with movement of a player,
said program product storing a program for making a computer:
- judge positions of movement of a first player and a ball on a time axis,
- judge an instruction of movement of said ball from said first player to said second player in response to an operation of the user,
- predict a future positional relationship between said first player and said ball by said judgement on the time axis,
- calculate a time required until said first player reaches said ball only when it is judged that said first player can reach said ball from said predicted positional relationship, a plurality of groups of motions for making the ball move between players being assigned to each player and display times being assigned to each group of motions,
- judge a group of motions having a display time shorter than said calculated required time and making said ball move from said first player to a second player by said judged group of motions from said pluraliy of groups of motions assigned to said first player, and
- display movement of said first player using said judged group of motions.

6. A program product as set forth in claim 3, wherein said program further makes said computer:
- judge the group of motions for making said ball move from said first player to said second player from said plurality of groups of motions assigned to said second player in accordance with the group of motions judged for the first player and
- display movement of said second player using said group of motions judged for said second player along with displaying said movement of said first player.

7. A program for a ball-playing type game which realizes a ball-playing game indirectly controlling movement of a ball in accordance with movement of a player using a computer, comprising making a computer:
- judge positions of movement of a first player and a ball on a time axis,
- judge a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, display movement of said first player using said judged group of motions, judge the group of motions for making said ball move from said first player to said second player from said plurality of groups of motions assigned to said second player in accordance with a future positional relationship between said first player and said ball judged on said time axis, and display movement of said second player using said group of motions judged for said second player along with displaying said movement of said first player.

8. A program for a ball-playing type game which realizes a ball-playing game indirectly controlling movement of a ball in accordance with movement of a player using a computer, comprising making a computer:

judge positions of movement of a first player and a ball on a time axis, judge an instruction for movement of said ball from said first player to said second player in response to an operation by a user, judge group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, display movement of said first player using said judged group of motions, judge the group of motions for making said ball move from said first player to said second player from said plurality of groups of motions assigned to said second player in accordance with a future positional relationship between said first player and said ball judged on said time axis, and display movement of said second player using said group of motions judged for said second player along with displaying said movement of said first player.

9. A program for a ball-playing type game which realizes a ball-playing game indirectly controlling movement of a ball in accordance with movement of a player using a computer, comprising making a computer:

judge positions of movement of a first player and a ball on a time axis, predict a future positional relationship between said first player and said ball by said judgement on the time axis, calculate a time required until said first player reaches said ball only when it is judged that said first player can reach said ball from said predicted positional relationship, a plurality of groups of motions for making the ball move between players being assigned to each player and display times being assigned to each group of motions, judge a group of motions having a display time shorter than said calculated required time and making said ball move from said first player to a second player by said judged group of motions from said pluraliy of groups of motions assigned to said first player, and display movement of said first player using said judged group of motions.

10. A program as set forth in claim 9, further making said computer:

judge the group of motions for making said ball move from said first player to said second player from said plurality of groups of motions assigned to said second player in accordance with the group of motions judged for the first player and display movement of said second player using said group of motions judged for said second player along with displaying said movement of said first player.

11. A program for a ball-playing type game which realizes a ball-playing game indirectly controlling movement of a ball in accordance with movement of a player using a computer comprising making a computer:

judge positions of movement of a first player and a ball on a time axis, judge an instruction of movement of said ball from said first player to said second player in response to an operation of the user, predict a future positional relationship between said first player and said ball by said judgement on the time axis, calculate a time required until said first player reaches said ball only when it is judged that said first player can reach said ball from said predicted positional relationship, a plurality of groups of motions for making the ball move between players being assigned to each player and display times being assigned to each group of motions, judge a group of motions having a display time shorter than said calculated required time and making said ball move from said first player to a second player by said judged group of motions from said pluraliy of groups of motions assigned to said first player, and display movement of said first player using said judged group of motions.

12. A program as set forth in claim 11, further making said computer:

judge the group of motions for making said ball move from said first player to said second player from said plurality of groups of motions assigned to said second player in accordance with the group of motions judged for the first player and display movement of said second player using said group of motions judged for said second player along with displaying said movement of said first player.

13. A ball-playing type processor comprising:

a computer readable program product storing a program for realizing a ball-playing game indirectly controlling movement of a ball in accordance with movement of a player, a computer for reading and executing at least part of a program from said program product, and a display for displaying a ball-playing type game realized by said program, said computer reading at least part of a program from said program product and, thereby judging positions of movement of a first player and a ball on a time axis, judging a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, displaying movement of said first player using said judged group of motions, judging the group of motions for making said ball move from said first player to said second player from said plurality of groups of motions assigned to said second player in accordance with a future positional relationship between said first player and said ball judged on said time axis, and displaying movement of said second player using said group of motions judged for said second player along with displaying said movement of said first player.

14. A ball-playing type processor comprising:

a computer readable program product storing a program for realizing a ball-playing game indirectly controlling movement of a ball in accordance with movement of a player, a computer for reading and executing at least part of a program from said program product, and a display for displaying a ball-playing type game realized by said program, said computer reading at least part of a program from said program product and, thereby judging positions of movement of a first player and a ball on a time axis, judging an instruction for movement of said ball from said first player to said second player in response to an operation by a user, judging a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, displaying movement of said first player using said judged group of motions, judging the group of motions for making said ball move from said first player to said second player from said plurality of groups of motions assigned to said second player in accordance with a future positional relationship between said first player and said ball judged on said time axis, and displaying movement of said second player using said group of motions judged for said second player along with displaying said movement of said first player.

15. A ball-playing type processor comprising:

a computer readable program product storing a program for realizing a ball-playing game indirectly controlling movement of a ball in accordance with movement of a player, a computer for reading and executing at least part of a program from said program product, and a display for displaying a ball-playing type game realized by said program, said computer reading at least part of a program from said program product and thereby judging positions of movement of a first player and a ball on a time axis, predicting a future positional relationship between said first player and said ball by said judgement on the time axis, calculating a time required until said first player reaches said ball only when it is judged that said first player can reach said ball from said predicted positional relationship, a plurality of groups of motions for making the ball move between players being assigned to each player and display times being assigned to each group of motions, judging a group of motions having a display time shorter than said calculated required time and making said ball move from said first player to a second player by said judged group of motions from said pluraliy of groups of motions assigned to said first player, and displaying movement of said first player using said judged group of motions.

16. A ball-playing type game processor as set forth in claim 15, wherein said program further makes said computer:

judge the group of motions for making said ball move from said first player to said second player from said plurality of groups of motions assigned to said second player in accordance with the group of motions judged for the first player and display movement of said second player using said group of motions judged for said second player along with displaying said movement of said first player.

17. A ball-playing type processor comprising:

a computer readable program product storing a program for realizing a ball-playing game indirectly controlling movement of a ball in accordance with movement of a player, a computer for reading and executing at least part of a program from said program product, and a display for displaying a ball-playing type game realized by said program, said computer reading at least part of a program from said program product and thereby judging positions of movement of a first player and a ball on a time axis, judging an instruction of movement of said ball from said first player to said second player in response to an operation of the user, predicting a future positional relationship between said first player and said ball by said judgement on the time axis, calculating a time required until said first player reaches said ball only when it is judged that said first player can reach said ball from said predicted positional relationship, a plurality of groups of motions for making the ball move between players being assigned to each player and display times being assigned to each group of motions, judging a group of motions having a display time shorter than said calculated required time and making said ball move from said first player to a second player by said judged group of motions from said pluraliy of groups of motions assigned to said first player, and displaying movement of said first player using said judged group of motions.

18. A ball-playing type game processor as set forth in claim 17, wherein said program further makes said computer:

judge the group of motions for making said ball move from said first player to said second player from said plurality of groups of motions assigned to said second player in accordance with the group of motions judged for the first player and display movement of said second player using said group of motions judged for said second player along with displaying said movement of said first player.

19. A ball-playing type processing method for realizing a ball-playing game indirectly controlling movement of a ball in accordance with movement of a player, comprising:

judging positions of movement of a first player and a ball on a time axis, judging a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, displaying movement of said first player using said judged group of motions, judging the group of motions for making said ball move from said first player to said second player from said plurality of groups of motions assigned to said second player in accordance with a future positional relationship between said first player and said ball judged on said time axis, and displaying movement of said second player using said group of motions judged for said second player along with displaying said movement of said first player.

20. A ball-playing type processing method for realizing a ball-playing game indirectly controlling movement of a ball in accordance with movement of a player, comprising:

judging positions of movement of a first player and a ball on a time axis, judging an instruction for movement of said ball from said first player to said second player in response to an operation by a user, judging a group of motions for making said ball move from said first player to a second player from a plurality of groups of motions assigned to said first player in accordance with a future positional relationship between said first player and said ball judged on said time axis, a plurality of groups of motions for making the ball move between players being assigned to each player, displaying movement of said first player using said judged group of motions, judging the group of motions for making said ball move from said first player to said second player from said plurality of groups of motions assigned to said second player in accordance with a future positional relationship between said first player and said ball judged on said time axis, and displaying movement of said second player using said group of motions judged for said second player along with displaying said movement of said first player.

21. A ball-playing type processing method for realizing a ball-playing game indirectly controlling movement of a ball in accordance with movement of a player, comprising:

judging positions of movement of a first player and a ball on a time axis, predicting a future positional relationship between said first player and said ball by said judgement on the time axis, calculating a time required until said first player reaches said ball only when it is judged that said first player can reach said ball from said predicted positional relationship, a plurality of groups of motions for making the ball move between players being assigned to each player and display times being assigned to each group of motions, judging a group of motions having a display time shorter than said calculated required time and making said ball move from said first player to a second player by said judged group of motions from said pluraliy of groups of motions assigned to said first player, and displaying movement of said first player using said judged group of motions.

22. A ball-playing type game processing method as set forth in claim 21, further comprising:

judging the group of motions for making said ball move from said first player to said second player from said plurality of groups of motions assigned to said second player in accordance with the group of motions judged for the first player and displaying movement of said second player using said group of motions judged for said second player along with displaying said movement of said first player.

23. A ball-playing type processing method for realizing a ball-playing game indirectly controlling movement of a ball in accordance with movement of a player, comprising:

judging positions of movement of a first player and a ball on a time axis, judging an instruction of movement of said ball from said first player to said second player in response to an operation of the user, predicting a future positional relationship between said first player and said ball by said judgement on the time axis, calculating a time required until said first player reaches said ball only when it is judged that said first player can reach said ball from said predicted positional relationship, a plurality of groups of motions for making the ball move between players being assigned to each player and display times being assigned to each group of motions, judging a group of motions having a display time shorter than said calculated required time and making said ball move from said first player to a second player by said judged group of motions from said pluraliy of groups of motions assigned to said first player, and displaying movement of said first player using said judged group of motions.

24. A ball-playing type game processing method as set forth in claim 23, further comprising:

judging the group of motions for making said ball move from said first player to said second player from said plurality of groups of motions assigned to said second player in accordance with the group of motions judged for the first player and displaying movement of said second player using said group of motions judged for said second player along with displaying said movement of said first player.

* * * * *

UNITED STATES PATENT AND TRADEMARK OFFICE
CERTIFICATE OF CORRECTION

PATENT NO. : 6,340,332 B1
DATED : January 22, 2002
INVENTOR(S) : S. Rimoto et al.

It is certified that error appears in the above-identified patent and that said Letters Patent is hereby corrected as shown below:

<u>Title page,</u>
Item [56], References Cited, the following FOREIGN PATENT DOCUMENTS, were omitted and should be included:

-- 98/43715    10/1998    W.I.P.O.
       0916376     5/1999     E.P.O. --

<u>Column 30,</u>
Line 50, "claim 3" should be -- claim 5 --.

Signed and Sealed this

Twenty-sixth Day of November, 2002

Attest:

Attesting Officer

JAMES E. ROGAN
*Director of the United States Patent and Trademark Office*